US012713306B2

(12) United States Patent
Gürsu et al.

(10) Patent No.: US 12,713,306 B2
(45) Date of Patent: Aug. 18, 2026

(54) DUAL CONNECTIVITY

(71) Applicant: NOKIA TECHNOLOGIES OY, Espoo (FI)

(72) Inventors: Halit Murat Gürsu, Munich (DE); Ahmad Awada, Munich (DE); Panagiotis Spapis, Munich (DE); Umur Karabulut, Munich (DE); Jedrzej Stanczak, Wroclaw (PL); Krzysztof Kordybach, Wroclaw (PL); Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/101,438

(22) PCT Filed: Aug. 2, 2023

(86) PCT No.: PCT/EP2023/071394
§ 371 (c)(1),
(2) Date: Feb. 5, 2025

(87) PCT Pub. No.: WO2024/033180
PCT Pub. Date: Feb. 15, 2024

(65) Prior Publication Data

US 2025/0261056 A1 Aug. 14, 2025

(30) Foreign Application Priority Data

Aug. 8, 2022 (GB) ..................................... 2211539

(51) Int. Cl.
*H04W 36/00* (2009.01)
*H04W 36/36* (2009.01)

(52) U.S. Cl.
CPC ... *H04W 36/0069* (2018.08); *H04W 36/0058* (2018.08); *H04W 36/362* (2023.05)

(58) Field of Classification Search
CPC ......... H04W 36/0005; H04W 36/0055; H04W 36/0058; H04W 36/0061; H04W 36/0069;
(Continued)

(56) References Cited

U.S. PATENT DOCUMENTS

2021/0105681 A1 4/2021 Paladugu et al.
2021/0352543 A1 11/2021 Purkayastha et al.
(Continued)

FOREIGN PATENT DOCUMENTS

WO 2020/220315 A1 11/2020
WO 2021035384 A1 3/2021
(Continued)

OTHER PUBLICATIONS

International Search Report and Written Opinion issued in corresponding International Application No. PCT/EP2023/071394 mailed Nov. 9, 2023, all pages cited in its entirety.
(Continued)

*Primary Examiner* — Matthew W Genack
(74) *Attorney, Agent, or Firm* — ALSTON & BIRD LLP

(57) ABSTRACT

A method, apparatus, and computer program for causing a master node operating with dual connectivity to a user equipment with a first secondary node to: determine that a primary cell of a secondary cell group is to switch from a first cell serving the user equipment, wherein the first cell is provided by the first secondary node; determine, for a second cell provided by a second secondary node, at least one measurement configuration that will remain valid after or during a time period when the primary cell of the secondary cell group serving the user equipment switches
(Continued)

from the first cell to the second cell; and provide the at least one measurement configuration to the user equipment.

9 Claims, 13 Drawing Sheets

(58) Field of Classification Search
CPC ....... H04W 36/0083; H04W 36/00833; H04W 36/00835; H04W 36/00837; H04W 36/0085; H04W 36/0088; H04W 36/0094; H04W 36/24; H04W 36/30
See application file for complete search history.

(56) References Cited

U.S. PATENT DOCUMENTS

| | | | | |
|---|---|---|---|---|
| 2022/0408295 | A1* | 12/2022 | Rugeland | H04W 24/10 |
| 2023/0300691 | A1 | 9/2023 | Eklöf et al. | |
| 2023/0319669 | A1 | 10/2023 | Awada et al. | |
| 2023/0370915 | A1 | 11/2023 | Da Silva et al. | |
| 2023/0370936 | A1 | 11/2023 | Eklöf et al. | |
| 2023/0379776 | A1 | 11/2023 | Eklöf et al. | |
| 2023/0379788 | A1 | 11/2023 | Eklöf et al. | |
| 2023/0379789 | A1 | 11/2023 | Da Silva et al. | |
| 2023/0388871 | A1* | 11/2023 | Guo | H04W 36/0069 |
| 2023/0397082 | A1 | 12/2023 | Pan et al. | |
| 2024/0022980 | A1* | 1/2024 | Da Silva | H04W 36/0085 |
| 2024/0040451 | A1 | 2/2024 | Da Silva et al. | |
| 2024/0098611 | A1 | 3/2024 | Da Silva et al. | |
| 2024/0276320 | A1 | 8/2024 | Eklöf et al. | |
| 2024/0406820 | A1 | 12/2024 | Stanczak et al. | |
| 2025/0015943 | A1 | 1/2025 | Futaki et al. | |
| 2025/0039761 | A1 | 1/2025 | Futaki et al. | |
| 2025/0048222 | A1 | 2/2025 | Futaki et al. | |
| 2025/0081055 | A1 | 3/2025 | Stanczak et al. | |
| 2025/0133468 | A1 | 4/2025 | Li et al. | |

FOREIGN PATENT DOCUMENTS

| | | | |
|---|---|---|---|
| WO | 2021/064526 | A1 | 4/2021 |
| WO | 2021/069625 | A1 | 4/2021 |
| WO | 2022/074564 | A1 | 4/2022 |
| WO | 2022/074620 | A1 | 4/2022 |
| WO | 2022/086388 | A1 | 4/2022 |
| WO | 2022086243 | A1 | 4/2022 |
| WO | 2022/132580 | A1 | 6/2022 |
| WO | WO-2022127731 | A1 * | 6/2022 |
| WO | 2022/240334 | A1 | 11/2022 |
| WO | 2022/256958 | A1 | 12/2022 |
| WO | 2023/141837 | A1 | 8/2023 |
| WO | 2023/191769 | A1 | 10/2023 |
| WO | 2024/027971 | A1 | 2/2024 |

OTHER PUBLICATIONS

"3rd Generation Partnership Project; Technical Specification Group Radio Access Network; Study on New Radio (NR) access technology (Release 17)", 3GPP TR 38.912 v17.0.0, (Mar. 2022), 74 pages.
Asustek, "Correction of AUL HARQ process", 3GPP TSG-RAN WG2 #110e, Change Request CR 4343, R2-2005775, (Jun. 1-12, 2020), 3 pages.
CATT, "Introduction of CPA and inter-SN CPC", 3GPP TSG-RAN WG2 Meeting #117-e, R2-2203797, (Feb. 21-Mar. 3, 2022), 37 pages.
Ericsson et al., "Introduction of Sidelink Relay over Xn", 3GPP TSG-RAN WG3 Meeting #115-e, Change Request CR 0693, R3-222988, (Feb. 21-Mar. 3, 2022), 68 pages.
Ericsson, "Correction of description of CHO events for Mobility Enhancements", 3GPP TSG-RAN WG2 Meeting #111, Change Request CR 1868, R2-2008292, (Aug. 17-28, 2020), 898 pages.
Ericsson, "Correction of field description for Mobility Enhancements", 3GPP TSG-RAN WG2 Meeting #111, Change Request CR 1866, R2-2007592, (Aug. 17-28, 2020), 898 pages.
Huawei et al., "Corrections for CPAC", 3GPP TSG-RAN WG2 Meeting #118-e, R2-2205927, (May 9-20, 2022), 9 pages.
Huawei et al., "Discussion on Conditional PSCell addition/change", 3GPP TSG-RAN WG2 #111-e, R2-2007679, (Aug. 17-28, 2020), 7 pages.
Huawei et al., "Introduction of efficient SCG activation/deactivation", 3GPP TSG-RAN WG2 Meeting #116-e, R2-2111638, (Nov. 1-12, 2021), 947 pages.
Lenovo et al., "Correction on CPAC", 3GPP TSG-RAN WG3 Meeting #116-e, Change Request CR 1692, R3-223897, (May 9-19, 2022), 19 pages.
ZTE Corporation et al., "Corrections on TS 37.340 for DCCA enhancement", 3GPP TSG-RAN WG2 Meeting #118-e, R2-2206164, (May 9-20, 2022), 59 pages.
ZTE et al., "Introduction of further multi-RAT dual-connectivity enhancements", 3GPP TSG-RAN WG2 Meeting #117-e, Change Request CR 0309, R2-2203690, (Feb. 21-Mar. 3, 2022), 100 pages.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 v16.10.0, (Jun. 2022), 90 pages.
"3rd Generation Partnership Project; Technical Specification Group Radio Access Network; NG-RAN; Xn application protocol (XnAP) (Release 16)", 3GPP TS 38.423 v16.10.0, (Jun. 2022), 470 pages.
Apple, "Consecutive Conditional Handover", 3GPP TSG-RAN WG2 Meeting #107, R2-1909862, (Aug. 26-30, 2019), 4 pages.
CATT, "Introduction of CPA and inter-SN CPC", 3GPP TSG-RAN WG2 Meeting #116-e, R2-2111640, (Nov. 1-12, 2021), 34 pages.
Mediatek, "New WID on Further NR mobility enhancements", 3GPP TSG RAN Meeting #94e, RP-213565, (Dec. 6-17, 2021), 5 pages.
Search Report for United Kingdom Application No. GB2211539.8 dated Jan. 20, 2023, 8 pages.
ETSI MCC, "Report of 3GPP TSG RAN WG2 meeting #117-e, Online", 3GPP TSG-RAN WG2 meeting #118-e, R2-2204401, (Feb. 21-Mar. 3, 2022), 417 pages.
Lenovo et al., "Issues on inter-SN CPC", 3GPP TSG-RAN WG2 Meeting #112e, R2-2009868, (Nov. 2-13, 2020), 3 pages.
Mediatek, "Moderator's summary of discussion for [94e-14-R18-MobEnh]", 3GPP TSG RAN Meeting #94-e, RP-213541, (Dec. 6-17, 2021), 70 pages.
Office Action for European Application No. 23754158.6 dated Nov. 17, 2025, 9 pages.
Vivo, "Discussion on CPAC procedures from NW perspective", 3GPP TSG-RAN WG2 Meeting #116bis-e, R2-2200589, (Jan. 17-25, 2022), 4 pages.
Vivo, "Discussion on CPAC procedures from UE perspective", 3GPP TSG-RAN WG2 Meeting #117-e, R2-2202305, (Feb. 21-Mar. 3, 2022), 5 pages.
Examination Report for Australian Application No. 2023322276 dated Dec. 24, 2025, 4 pages.
"3rd Generation Partnership Project; Technical Specification Group Radio Access Network; NG-RAN; Xn application protocol (XnAP)(Release 17)", BGPP TS 38.423 v17.5.0, (Jun. 2023), pp. 56-65, 70-72.
Notice of Reasons for Refusal for Japanese Application No. 2025-507293 dated Feb. 24, 2026, 7 pages.
Office Action for Canadian Application No. 3,264,410 dated Feb. 9, 2026, 4 pages.
Office Action for Thailand Application No. 2501000746 dated Jan. 29, 2026, 8 pages.

* cited by examiner

Fig. 5

514
512
NETWORK
506
CN
510
CU
516
AP
DU
508
504
UE
UE
502
500

Configurations after CPC execution

CPC 2-1, PSCell 2-1 controlled by SN2

MCG 2-1

SCG 2-1

CPAC execution condition 2-1 decided by SN

DC config, PSCell 1-1 controlled by SN1

MCG 1-1

SCG 1-1

CPC 2-2, PSCell 2-2 controlled by SN2

MCG 2-2

SCG 2-2

CPAC execution condition 2-2 decided by SN

DUAL CONNECTIVITY

FIELD OF THE DISCLOSURE

The examples described herein generally relate to apparatus, methods, and computer programs, and more particularly (but not exclusively) to apparatus, methods and computer programs for network apparatuses.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to a first aspect, there is provided a method for a master node operating with dual connectivity to a user equipment with a first secondary node, the method comprising: determining that a primary cell of a secondary cell group is to switch from a first cell serving the user equipment, wherein the first cell is provided by the first secondary node; determining, for a second cell provided by a second secondary node, at least one measurement configuration that will remain valid after or during a time period when the primary cell of the secondary cell group serving the user equipment switches from the first cell to the second cell; and providing the at least one measurement configuration to the user equipment.

Said determining at least one measurement configuration may comprise: identifying a measurement configuration provided by the first secondary node is to be applied by the user equipment after the user equipment switches from the first cell to the second cell; and setting the identified measurement configuration as the at least one measurement configuration.

Said determining at least one measurement configuration may comprise: determining a range of first measurement identifier values reserved for use by the first secondary node for measurement configurations associated with the first secondary node; providing the range of first measurement identifier values to the second secondary node; and receiving the at least one measurement configuration from the second secondary node, wherein the at least one measurement configuration does not comprise any measurement identifiers having an associated value falling within said range of first measurement identifier values.

Said determining at least one measurement configuration may comprise: determining a range of first measurement identifier values reserved for use by the first secondary node for associated measurement configurations; providing the range of first measurement identifier values and the associated measurement configuration to the second secondary node; and receiving the at least one measurement configuration from the second secondary node, wherein the at least one measurement configuration comprises at least one measurement identifier having an associated value falling within said range of first measurement identifier values.

Said determining that the first cell is to stop acting as the primary cell of the secondary cell group for the user equipment may comprise receiving an indication to this effect from the first secondary cell, and wherein said determining a range of first measurement identifier values comprises receiving the range of first measurement identifier values from the first secondary node.

Said determining that the first cell is to stop acting as the primary cell of the secondary cell group for the user equipment may be performed without receiving an indication to this effect from the first secondary cell, and wherein said determining a range of first measurement identifier values comprises generating the range of first measurement identifier values.

According to a second aspect, there is provided a method for a first secondary node operating with dual connectivity to a user equipment with a master node, the method comprising: determining that a primary cell of a secondary cell group is to switch from a first cell serving the user equipment, wherein the first cell is provided by the first secondary node; and signalling, to the master node, an indication that the first cell will stop acting as the primary cell of the secondary cell group, wherein the indication comprises a range of first measurement identifier values reserved for use by the first secondary node for measurement configurations associated with the first secondary node.

According to a third aspect, there is provided a method for a second secondary node, the method comprising: receiving, from a master node, an indication that a primary cell of a secondary cell group is to switch from a first cell serving the user equipment, wherein the first cell is provided by the first secondary node, and wherein the indication comprises a range of first measurement identifier values reserved for use by the first secondary node for measurement configurations associated with the first secondary node; generating at least one measurement configuration for use by the user equipment in the event the user equipment starts using a cell provided by the second secondary node as the primary cell of the secondary cell group; and signalling the generated at least one measurement configuration to the master node.

Said generating may comprise generating the at least one measurement configuration such that it comprises a measurement identifier value falling outside of the range of first measurement identifier values.

Said generating may comprise generating the at least one measurement configuration such that it comprises a measurement identifier value falling within the range of first measurement identifier values.

Subsequent to said signalling the generated at least one measurement configuration to the master node, the method may comprise: generating at least one second cell measurement configuration for the user equipment to apply when the primary cell of the secondary cell group is being provided by a second cell provided by the second secondary cell; and signalling said generated at least one second cell measurement configuration to the user equipment when the primary cell of the secondary cell group is being provided by the second cell.

According to a fourth aspect, there is provided a method for a user equipment configured to operate with dual connectivity to a master node and a first secondary node, the method comprising: maintaining data connectivity with a first cell provided by the first secondary node by using the first cell as a primary cell of a secondary cell group; receiving, from a master node, at least one measurement configuration that may be applied by the user equipment in the event that the user equipment determines to switch the user equipment's primary cell of the secondary cell group from the first cell to a second cell provided by a second secondary node; switching said primary cell of the secondary cell group from the first cell to the second cell; and performing measurements in the second cell in accordance with the received at least one measurement configuration.

The method may comprise: receiving, from the second secondary node, at least one secondary cell measurement configuration to be applied when the primary cell of the secondary cell group is the second cell; stopping said performing measurements in accordance with the received at least one measurement configuration; and initiating performing measurements in the second cell in accordance with the received at least one secondary cell measurement configuration.

The at least one measurement configuration may be independent of a second measurement configuration association with the second secondary cell.

The method may comprise: receiving a first measurement configuration associated with the first secondary cell; and applying the first measurement configuration only when the primary cell of the secondary cell group for the user equipment is being provided by the first cell.

The method may comprise: using the at least one measurement configuration when the primary cell of the secondary cell group for the user equipment is being provided by the first cell.

The method may comprise: generating a measurement configuration variable and storing the measurement configuration variable for use while the primary cell of the secondary cell group is being provided by the second cell.

The method may comprise: receiving an indication to release the stored measurement configuration variable from the secondary cell currently providing a cell acting as a primary cell of a secondary cell group for the user equipment.

The method may comprise: receiving, from the second secondary node, at least one secondary cell measurement configuration to be applied by the user equipment when the second cell is acting as the primary cell of the secondary cell group for the user equipment; and applying the received at least one measurement configuration in addition to a measurement configuration provided by the secondary node.

The method may comprise: indicating measurement objects and measurement identifiers applied in the measurement configurations as part of a persistent measurement configuration configured by the master node.

According to a fifth aspect, there is provided an apparatus for a master node operating with dual connectivity to a user equipment with a first secondary node, the apparatus comprising means for: determining that a primary cell of a secondary cell group is to switch from a first cell serving the user equipment, wherein the first cell is provided by the first secondary node; determining, for a second cell provided by a second secondary node, at least one measurement configuration that will remain valid after or during a time period when the primary cell of the secondary cell group serving the user equipment switches from the first cell to the second cell; and providing the at least one measurement configuration to the user equipment.

Said determining means for determining at least one measurement configuration may comprise means for: identifying a measurement configuration provided by the first secondary node is to be applied by the user equipment after the user equipment switches from the first cell to the second cell; and setting the identified measurement configuration as the at least one measurement configuration.

Said determining means for determining at least one measurement configuration may comprise means for: determining a range of first measurement identifier values reserved for use by the first secondary node for measurement configurations associated with the first secondary node; providing the range of first measurement identifier values to the second secondary node; and receiving the at least one measurement configuration from the second secondary node, wherein the at least one measurement configuration does not comprise any measurement identifiers having an associated value falling within said range of first measurement identifier values.

Said determining means for determining at least one measurement configuration may comprise means for: determining a range of first measurement identifier values reserved for use by the first secondary node for associated measurement configurations; providing the range of first measurement identifier values and the associated measurement configuration to the second secondary node; and receiving the at least one measurement configuration from the second secondary node, wherein the at least one measurement configuration comprises at least one measurement identifier having an associated value falling within said range of first measurement identifier values.

Said determining means for determining that the first cell is to stop acting as the primary cell of the secondary cell group for the user equipment may comprise means for receiving an indication to this effect from the first secondary cell, and wherein said determining a range of first measurement identifier values comprises receiving the range of first measurement identifier values from the first secondary node.

Said determining means for determining that the first cell is to stop acting as the primary cell of the secondary cell group for the user equipment may be performed without receiving an indication to this effect from the first secondary cell, and wherein said determining a range of first measurement identifier values comprises generating the range of first measurement identifier values.

According to a sixth aspect, there is provided an apparatus for a first secondary node operating with dual connectivity to a user equipment with a master node, the apparatus comprising means for: determining that a primary cell of a secondary cell group is to switch from a first cell serving the user equipment, wherein the first cell is provided by the first secondary node; and signalling, to the master node, an indication that the first cell will stop acting as the primary cell of the secondary cell group, wherein the indication comprises a range of first measurement identifier values reserved for use by the first secondary node for measurement configurations associated with the first secondary node.

According to a seventh aspect, there is provided an apparatus for a second secondary node, the apparatus comprising means for: receiving, from a master node, an indication that a primary cell of a secondary cell group is to switch from a first cell serving the user equipment, wherein the first cell is provided by the first secondary node, and wherein the indication comprises a range of first measurement identifier values reserved for use by the first secondary node for measurement configurations associated with the first secondary node; generating at least one measurement configuration for use by the user equipment in the event the user equipment starts using a cell provided by the second secondary node as the primary cell of the secondary cell group; and signalling the generated at least one measurement configuration to the master node.

Said generating means for generating may comprise means for: generating the at least one measurement configuration such that it comprises a measurement identifier value falling outside of the range of first measurement identifier values.

Said generating means for generating may comprise means for: generating the at least one measurement configuration such that it comprises a measurement identifier value falling within the range of first measurement identifier values.

Subsequent to said signalling the generated at least one measurement configuration to the master node, the apparatus may comprise means for: generating at least one second cell measurement configuration for the user equipment to apply when the primary cell of the secondary cell group is being provided by a second cell provided by the second secondary cell; and signalling said generated at least one second cell measurement configuration to the user equipment when the primary cell of the secondary cell group is being provided by the second cell.

According to an eighth aspect, there is provided an apparatus for a user equipment configured to operate with dual connectivity to a master node and a first secondary node, the apparatus comprising means for: maintaining data connectivity with a first cell provided by the first secondary node by using the first cell as a primary cell of a secondary cell group; receiving, from a master node, at least one measurement configuration that may be applied by the user equipment in the event that the user equipment determines to switch the user equipment's primary cell of the secondary cell group from the first cell to a second cell provided by a second secondary node; switching said primary cell of the secondary cell group from the first cell to the second cell; and performing measurements in the second cell in accordance with the received at least one measurement configuration.

The apparatus may comprise means for: receiving, from the second secondary node, at least one secondary cell measurement configuration to be applied when the primary cell of the secondary cell group is the second cell; stopping said performing measurements in accordance with the received at least one measurement configuration; and initiating performing measurements in the second cell in accordance with the received at least one secondary cell measurement configuration.

The at least one measurement configuration may be independent of a second measurement configuration association with the second secondary cell.

The apparatus may comprise means for: receiving a first measurement configuration associated with the first secondary cell; and applying the first measurement configuration only when the primary cell of the secondary cell group for the user equipment is being provided by the first cell.

The apparatus may comprise means for: using the at least one measurement configuration when the primary cell of the secondary cell group for the user equipment is being provided by the first cell.

The apparatus may comprise means for: generating a measurement configuration variable and storing the measurement configuration variable for use while the primary cell of the secondary cell group is being provided by the second cell.

The apparatus may comprise means for: receiving an indication to release the stored measurement configuration variable from the secondary cell currently providing a cell acting as a primary cell of a secondary cell group for the user equipment.

The apparatus may comprise means for: receiving, from the second secondary node, at least one secondary cell measurement configuration to be applied by the user equipment when the second cell is acting as the primary cell of the secondary cell group for the user equipment; and applying the received at least one measurement configuration in addition to a measurement configuration provided by the secondary node.

The apparatus may comprise means for: indicating measurement objects and measurement identifiers applied in the measurement configurations as part of a persistent measurement configuration configured by the master node.

According to a ninth aspect, there is provided an apparatus for a master node operating with dual connectivity to a user equipment with a first secondary node, the apparatus comprising: at least one processor; and at least one memory comprising code that, when executed by the at least one processor, causes the apparatus to: determine that a primary cell of a secondary cell group is to switch from a first cell serving the user equipment, wherein the first cell is provided by the first secondary node; determine, for a second cell provided by a second secondary node, at least one measurement configuration that will remain valid after or during a time period when the primary cell of the secondary cell group serving the user equipment switches from the first cell to the second cell; and provide the at least one measurement configuration to the user equipment.

Said determining at least one measurement configuration may comprise: identifying a measurement configuration provided by the first secondary node is to be applied by the user equipment after the user equipment switches from the first cell to the second cell; and setting the identified measurement configuration as the at least one measurement configuration.

Said determining at least one measurement configuration may comprise: determining a range of first measurement identifier values reserved for use by the first secondary node for measurement configurations associated with the first secondary node; providing the range of first measurement identifier values to the second secondary node; and receiving the at least one measurement configuration from the second secondary node, wherein the at least one measurement configuration does not comprise any measurement identifiers having an associated value falling within said range of first measurement identifier values.

Said determining at least one measurement configuration may comprise: determining a range of first measurement identifier values reserved for use by the first secondary node for associated measurement configurations; providing the range of first measurement identifier values and the associated measurement configuration to the second secondary node; and receiving the at least one measurement configuration from the second secondary node, wherein the at least one measurement configuration comprises at least one measurement identifier having an associated value falling within said range of first measurement identifier values.

Said determining that the first cell is to stop acting as the primary cell of the secondary cell group for the user equipment may comprise receiving an indication to this effect from the first secondary cell, and wherein said determining a range of first measurement identifier values comprises receiving the range of first measurement identifier values from the first secondary node.

Said determining that the first cell is to stop acting as the primary cell of the secondary cell group for the user equipment may be performed without receiving an indication to this effect from the first secondary cell, and wherein said determining a range of first measurement identifier values comprises generating the range of first measurement identifier values.

According to a tenth aspect, there is provided an apparatus for a first secondary node operating with dual connectivity to a user equipment with a master node, the apparatus comprising: at least one processor; and at least one memory comprising code that, when executed by the at least one processor, causes the apparatus to: determine that a primary cell of a secondary cell group is to switch from a first cell serving the user equipment, wherein the first cell is provided by the first secondary node; and signal, to the master node, an indication that the first cell will stop acting as the primary cell of the secondary cell group, wherein the indication comprises a range of first measurement identifier values reserved for use by the first secondary node for measurement configurations associated with the first secondary node.

According to an eleventh aspect, there is provided an apparatus for a second secondary node, the apparatus comprising: at least one processor; and at least one memory comprising code that, when executed by the at least one processor, causes the apparatus to: receive, from a master node, an indication that a primary cell of a secondary cell group is to switch from a first cell serving the user equipment, wherein the first cell is provided by the first secondary node, and wherein the indication comprises a range of first measurement identifier values reserved for use by the first secondary node for measurement configurations associated with the first secondary node; generate at least one measurement configuration for use by the user equipment in the event the user equipment starts using a cell provided by the second secondary node as the primary cell of the secondary cell group; and signal the generated at least one measurement configuration to the master node.

Said generating may comprise: generating the at least one measurement configuration such that it comprises a measurement identifier value falling outside of the range of first measurement identifier values.

Said generating may comprise: generating the at least one measurement configuration such that it comprises a measurement identifier value falling within the range of first measurement identifier values.

Subsequent to said signalling the generated at least one measurement configuration to the master node, the apparatus may be caused to: generate at least one second cell measurement configuration for the user equipment to apply when the primary cell of the secondary cell group is being provided by a second cell provided by the second secondary cell; and signal said generated at least one second cell measurement configuration to the user equipment when the primary cell of the secondary cell group is being provided by the second cell.

According to a twelfth aspect, there is provided an apparatus for a user equipment configured to operate with dual connectivity to a master node and a first secondary node, the apparatus comprising: at least one processor; and at least one memory comprising code that, when executed by the at least one processor, causes the apparatus to: maintain data connectivity with a first cell provided by the first secondary node by using the first cell as a primary cell of a secondary cell group; receive, from a master node, at least one measurement configuration that may be applied by the user equipment in the event that the user equipment determines to switch the user equipment's primary cell of the secondary cell group from the first cell to a second cell provided by a second secondary node; switch said primary cell of the secondary cell group from the first cell to the second cell; and perform measurements in the second cell in accordance with the received at least one measurement configuration.

The apparatus may be caused to: receive, from the second secondary node, at least one secondary cell measurement configuration to be applied when the primary cell of the secondary cell group is the second cell; stop said performing measurements in accordance with the received at least one measurement configuration; and initiate performing measurements in the second cell in accordance with the received at least one secondary cell measurement configuration.

The at least one measurement configuration may be independent of a second measurement configuration association with the second secondary cell.

The apparatus may be caused to: receive a first measurement configuration associated with the first secondary cell; and apply the first measurement configuration only when the primary cell of the secondary cell group for the user equipment is being provided by the first cell.

The apparatus may be caused to: use the at least one measurement configuration when the primary cell of the secondary cell group for the user equipment is being provided by the first cell.

The apparatus may be caused to: generate a measurement configuration variable and storing the measurement configuration variable for use while the primary cell of the secondary cell group is being provided by the second cell.

The apparatus may be caused to: receive an indication to release the stored measurement configuration variable from the secondary cell currently providing a cell acting as a primary cell of a secondary cell group for the user equipment.

The apparatus may be caused to: receive, from the second secondary node, at least one secondary cell measurement configuration to be applied by the user equipment when the second cell is acting as the primary cell of the secondary cell group for the user equipment; and apply the received at least one measurement configuration in addition to a measurement configuration provided by the secondary node.

The apparatus may be caused to: indicate measurement objects and measurement identifiers applied in the measurement configurations as part of a persistent measurement configuration configured by the master node.

According to a thirteenth aspect, there is provided an apparatus for a master node operating with dual connectivity to a user equipment with a first secondary node, the apparatus comprising: determining circuitry for determining that a primary cell of a secondary cell group is to switch from a first cell serving the user equipment, wherein the first cell is provided by the first secondary node; determining circuitry for determining, for a second cell provided by a second secondary node, at least one measurement configuration that will remain valid after or during a time period when the primary cell of the secondary cell group serving the user equipment switches from the first cell to the second cell; and providing circuitry for providing the at least one measurement configuration to the user equipment.

Said determining circuitry for determining at least one measurement configuration may comprise circuitry for: identifying a measurement configuration provided by the first secondary node is to be applied by the user equipment after the user equipment switches from the first cell to the second cell; and setting the identified measurement configuration as the at least one measurement configuration.

Said determining circuitry for determining at least one measurement configuration may comprise circuitry for: determining a range of first measurement identifier values reserved for use by the first secondary node for measurement configurations associated with the first secondary node; providing the range of first measurement identifier values to the second secondary node; and receiving the at least one measurement configuration from the second secondary node, wherein the at least one measurement configuration does not comprise any measurement identifiers having an associated value falling within said range of first measurement identifier values.

Said determining circuitry for determining at least one measurement configuration may comprise circuitry for: determining a range of first measurement identifier values reserved for use by the first secondary node for associated measurement configurations; providing the range of first measurement identifier values and the associated measurement configuration to the second secondary node; and receiving the at least one measurement configuration from the second secondary node, wherein the at least one measurement configuration comprises at least one measurement identifier having an associated value falling within said range of first measurement identifier values.

Said determining circuitry for determining that the first cell is to stop acting as the primary cell of the secondary cell group for the user equipment may comprise circuitry for receiving an indication to this effect from the first secondary cell, and wherein said determining a range of first measurement identifier values comprises receiving the range of first measurement identifier values from the first secondary node.

Said determining circuitry for determining that the first cell is to stop acting as the primary cell of the secondary cell group for the user equipment may be performed without receiving an indication to this effect from the first secondary cell, and wherein said determining a range of first measurement identifier values comprises generating the range of first measurement identifier values.

According to a fourteenth aspect, there is provided an apparatus for a first secondary node operating with dual connectivity to a user equipment with a master node, the apparatus comprising: determining circuitry for determining that a primary cell of a secondary cell group is to switch from a first cell serving the user equipment, wherein the first cell is provided by the first secondary node; and signalling circuitry for signalling, to the master node, an indication that the first cell will stop acting as the primary cell of the secondary cell group, wherein the indication comprises a range of first measurement identifier values reserved for use by the first secondary node for measurement configurations associated with the first secondary node.

According to a fifteenth aspect, there is provided an apparatus for a second secondary node, the apparatus comprising: receiving circuitry for receiving, from a master node, an indication that a primary cell of a secondary cell group is to switch from a first cell serving the user equipment, wherein the first cell is provided by the first secondary node, and wherein the indication comprises a range of first measurement identifier values reserved for use by the first secondary node for measurement configurations associated with the first secondary node; generating circuitry for generating at least one measurement configuration for use by the user equipment in the event the user equipment starts using a cell provided by the second secondary node as the primary cell of the secondary cell group; and signalling circuitry for signalling the generated at least one measurement configuration to the master node.

Said generating circuitry for generating may comprise circuitry for: generating the at least one measurement configuration such that it comprises a measurement identifier value falling outside of the range of first measurement identifier values.

Said generating circuitry for generating may comprise circuitry for: generating the at least one measurement configuration such that it comprises a measurement identifier value falling within the range of first measurement identifier values.

Subsequent to said signalling the generated at least one measurement configuration to the master node, the apparatus may comprise: generating circuitry for generating at least one second cell measurement configuration for the user equipment to apply when the primary cell of the secondary cell group is being provided by a second cell provided by the second secondary cell; and signalling circuitry for signalling said generated at least one second cell measurement configuration to the user equipment when the primary cell of the secondary cell group is being provided by the second cell.

According to a sixteenth aspect, there is provided an apparatus for a user equipment configured to operate with dual connectivity to a master node and a first secondary node, the apparatus comprising: maintaining circuitry for maintaining data connectivity with a first cell provided by the first secondary node by using the first cell as a primary cell of a secondary cell group; receiving circuitry for receiving, from a master node, at least one measurement configuration that may be applied by the user equipment in the event that the user equipment determines to switch the user equipment's primary cell of the secondary cell group from the first cell to a second cell provided by a second secondary node; switching circuitry for switching said primary cell of the secondary cell group from the first cell to the second cell; and performing circuitry for performing measurements in the second cell in accordance with the received at least one measurement configuration.

The apparatus may comprise: receiving circuitry for receiving, from the second secondary node, at least one secondary cell measurement configuration to be applied when the primary cell of the secondary cell group is the second cell; stopping circuitry for stopping said performing measurements in accordance with the received at least one measurement configuration; and initiating circuitry for initiating performing measurements in the second cell in accordance with the received at least one secondary cell measurement configuration.

The at least one measurement configuration may be independent of a second measurement configuration association with the second secondary cell.

The apparatus may comprise: receiving circuitry for receiving a first measurement configuration associated with the first secondary cell; and applying the first measurement configuration only when the primary cell of the secondary cell group for the user equipment is being provided by the first cell.

The apparatus may comprise: using circuitry for using the at least one measurement configuration when the primary cell of the secondary cell group for the user equipment is being provided by the first cell.

The apparatus may comprise: generating circuitry for generating a measurement configuration variable and storing the measurement configuration variable for use while the primary cell of the secondary cell group is being provided by the second cell.

The apparatus may comprise: receiving circuitry for receiving an indication to release the stored measurement configuration variable from the secondary cell currently providing a cell acting as a primary cell of a secondary cell group for the user equipment.

The apparatus may: receiving circuitry for receiving, from the second secondary node, at least one secondary cell measurement configuration to be applied by the user equipment when the second cell is acting as the primary cell of the secondary cell group for the user equipment; and applying circuitry for applying the received at least one measurement configuration in addition to a measurement configuration provided by the secondary node.

The apparatus may comprise: indicating circuitry for indicating measurement objects and measurement identifiers applied in the measurement configurations as part of a persistent measurement configuration configured by the master node.

According to a seventeenth aspect, there is provided non-transitory computer readable medium comprising program instructions for causing an apparatus for a master node operating with dual connectivity to a user equipment with a first secondary node to perform at least the following: determine that a primary cell of a secondary cell group is to switch from a first cell serving the user equipment, wherein the first cell is provided by the first secondary node; determine, for a second cell provided by a second secondary node, at least one measurement configuration that will remain valid after or during a time period when the primary cell of the secondary cell group serving the user equipment switches from the first cell to the second cell; and provide the at least one measurement configuration to the user equipment.

Said determining at least one measurement configuration may comprise: identifying a measurement configuration provided by the first secondary node is to be applied by the user equipment after the user equipment switches from the first cell to the second cell; and setting the identified measurement configuration as the at least one measurement configuration.

Said determining at least one measurement configuration may comprise: determining a range of first measurement identifier values reserved for use by the first secondary node for measurement configurations associated with the first secondary node; providing the range of first measurement identifier values to the second secondary node; and receiving the at least one measurement configuration from the second secondary node, wherein the at least one measurement configuration does not comprise any measurement identifiers having an associated value falling within said range of first measurement identifier values.

Said determining at least one measurement configuration may comprise: determining a range of first measurement identifier values reserved for use by the first secondary node for associated measurement configurations; providing the range of first measurement identifier values and the associated measurement configuration to the second secondary node; and receiving the at least one measurement configuration from the second secondary node, wherein the at least one measurement configuration comprises at least one measurement identifier having an associated value falling within said range of first measurement identifier values.

Said determining that the first cell is to stop acting as the primary cell of the secondary cell group for the user equipment may comprise receiving an indication to this effect from the first secondary cell, and wherein said determining a range of first measurement identifier values comprises receiving the range of first measurement identifier values from the first secondary node.

Said determining that the first cell is to stop acting as the primary cell of the secondary cell group for the user equipment may be performed without receiving an indication to this effect from the first secondary cell, and wherein said determining a range of first measurement identifier values comprises generating the range of first measurement identifier values.

According to an eighteenth aspect, there is provided non-transitory computer readable medium comprising program instructions for causing an apparatus for a first secondary node operating with dual connectivity to a user equipment with a master node to perform at least the following: determine that a primary cell of a secondary cell group is to switch from a first cell serving the user equipment, wherein the first cell is provided by the first secondary node; and signal, to the master node, an indication that the first cell will stop acting as the primary cell of the secondary cell group, wherein the indication comprises a range of first measurement identifier values reserved for use by the first secondary node for measurement configurations associated with the first secondary node.

According to an nineteenth aspect, there is provided non-transitory computer readable medium comprising program instructions for causing an apparatus for a second secondary node to perform at least the following: receive, from a master node, an indication that a primary cell of a secondary cell group is to switch from a first cell serving the user equipment, wherein the first cell is provided by the first secondary node, and wherein the indication comprises a range of first measurement identifier values reserved for use by the first secondary node for measurement configurations associated with the first secondary node; generate at least one measurement configuration for use by the user equipment in the event the user equipment starts using a cell provided by the second secondary node as the primary cell of the secondary cell group; and signal the generated at least one measurement configuration to the master node.

Said generating may comprise: generating the at least one measurement configuration such that it comprises a measurement identifier value falling outside of the range of first measurement identifier values.

Said generating may comprise: generating the at least one measurement configuration such that it comprises a measurement identifier value falling within the range of first measurement identifier values.

Subsequent to said signalling the generated at least one measurement configuration to the master node, the apparatus may be caused to: generate at least one second cell measurement configuration for the user equipment to apply when the primary cell of the secondary cell group is being provided by a second cell provided by the second secondary cell; and signal said generated at least one second cell measurement configuration to the user equipment when the primary cell of the secondary cell group is being provided by the second cell.

According to a twentieth aspect, there is provided non-transitory computer readable medium comprising program instructions for causing an apparatus for a user equipment configured to operate with dual connectivity to a master node and a first secondary node to perform at least the following: maintain data connectivity with a first cell provided by the first secondary node by using the first cell as a primary cell of a secondary cell group; receive, from a master node, at least one measurement configuration that may be applied by the user equipment in the event that the user equipment determines to switch the user equipment's primary cell of the secondary cell group from the first cell to a second cell provided by a second secondary node; switch said primary cell of the secondary cell group from the first cell to the second cell; and perform measurements in the second cell in accordance with the received at least one measurement configuration.

The apparatus may be caused to: receive, from the second secondary node, at least one secondary cell measurement configuration to be applied when the primary cell of the secondary cell group is the second cell; stop said performing measurements in accordance with the received at least one measurement configuration; and initiate performing measurements in the second cell in accordance with the received at least one secondary cell measurement configuration.

The at least one measurement configuration may be independent of a second measurement configuration association with the second secondary cell.

The apparatus may be caused to: receive a first measurement configuration associated with the first secondary cell; and apply the first measurement configuration only when the primary cell of the secondary cell group for the user equipment is being provided by the first cell.

The apparatus may be caused to: use the at least one measurement configuration when the primary cell of the secondary cell group for the user equipment is being provided by the first cell.

The apparatus may be caused to: generate a measurement configuration variable and storing the measurement configuration variable for use while the primary cell of the secondary cell group is being provided by the second cell.

The apparatus may be caused to: receive an indication to release the stored measurement configuration variable from the secondary cell currently providing a cell acting as a primary cell of a secondary cell group for the user equipment.

The apparatus may be caused to: receive, from the second secondary node, at least one secondary cell measurement configuration to be applied by the user equipment when the second cell is acting as the primary cell of the secondary cell group for the user equipment; and apply the received at least one measurement configuration in addition to a measurement configuration provided by the secondary node.

The apparatus may be caused to: indicate measurement objects and measurement identifiers applied in the measurement configurations as part of a persistent measurement configuration configured by the master node.

According to a twenty first aspect, there is provided a computer program product stored on a medium that may cause an apparatus to perform any method as described herein.

According to a twenty second aspect, there is provided an electronic device that may comprise apparatus as described herein.

According to a twenty third aspect, there is provided a chipset that may comprise an apparatus as described herein.

BRIEF DESCRIPTION OF FIGURES

Some examples, will now be described, merely by way of illustration only, with reference to the accompanying drawings in which:

FIG. 5 shows a schematic representation of a network;

DETAILED DESCRIPTION

In the following description of examples, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, current 6G proposals).

Before describing in detail the examples, certain general principles of a 5G wireless communication system are briefly explained with reference to FIGS. 1A and 1B.

Figure 1A:
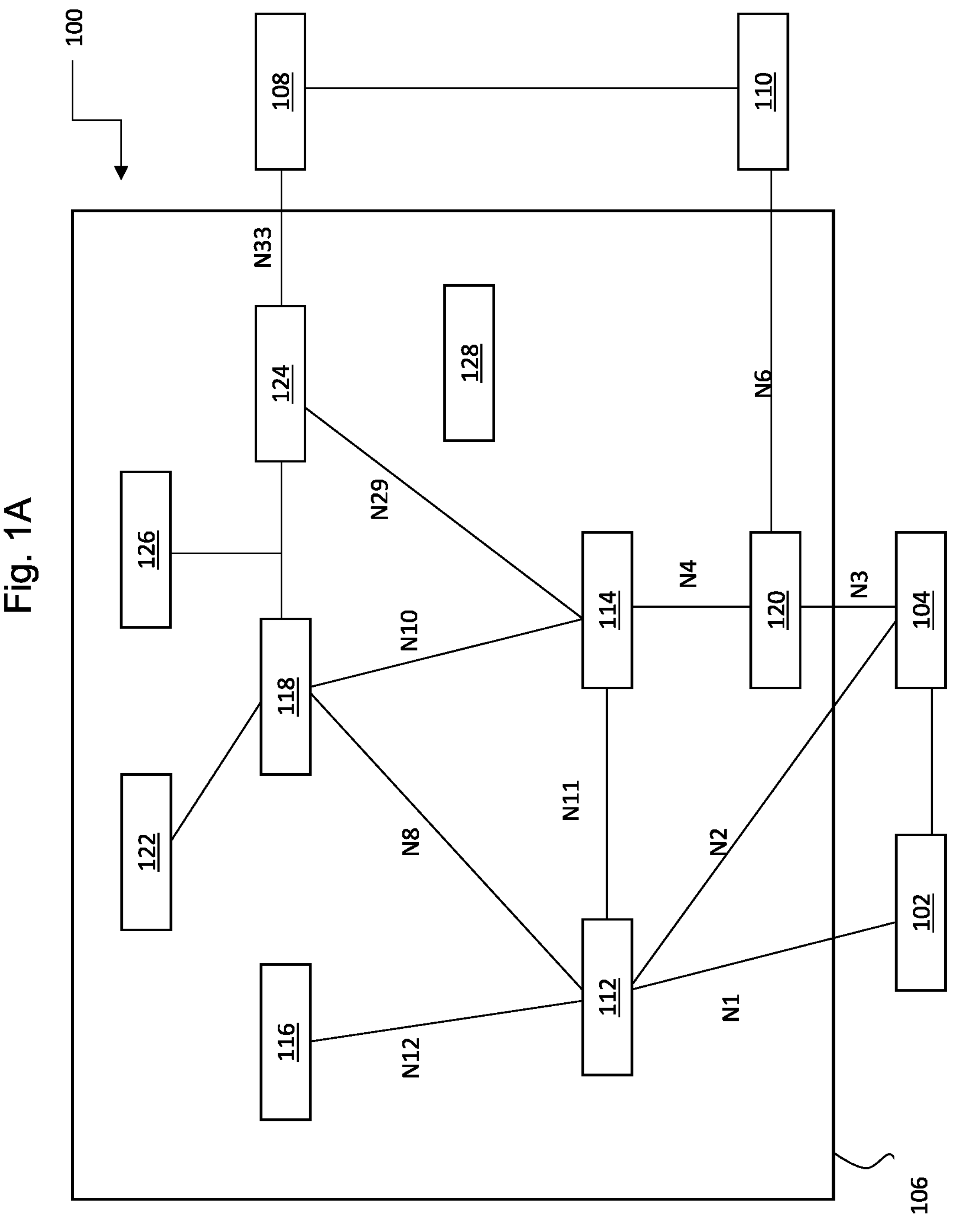
FIGS. 1A and 1B show a schematic representation of a 5G system.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) central unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer for a network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
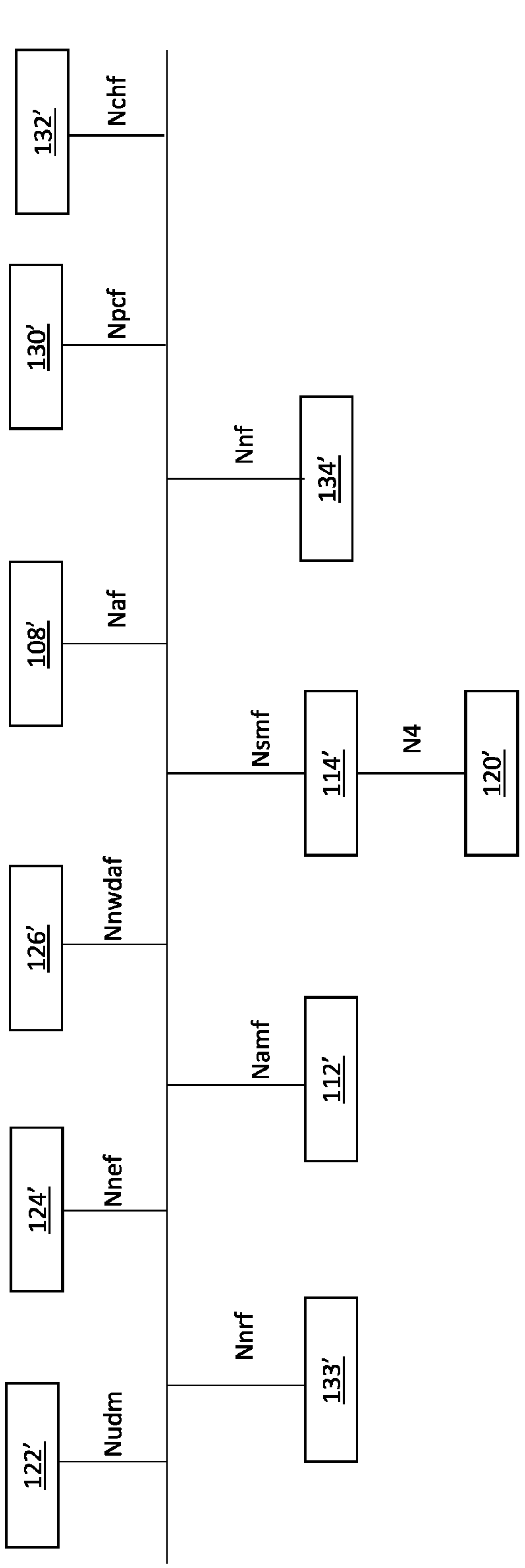

FIG. 1B shows a schematic representations of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

NG-Radio Access Network (NG-RAN) supports Multi-Radio Dual Connectivity (MR-DC) operation whereby a UE in RRC_CONNECTED is configured to utilise radio resources provided by two distinct schedulers, located in two different NG-RAN nodes connected via a non-ideal backhaul, one providing New Radio (NR) access and the other one providing either Evolved UMTS Terrestrial Radio Access Network (E-UTRA) or NR access. One of these nodes (a master node (MN) may establish a UE context at secondary node (SN) for providing resources from the SN to the UE. Example MR-DC operations include Conditional Primary cell of secondary cell group (PSCell) change (CPC) and Conditional PSCell addition (CPA).

Dual connectivity may be considered to be a mode of operation of a user equipment in a radio resource control (RCC) connected mode (RCC_CONNECTED mode), configured with a master cell group (MCG) and a secondary cell group (SCG). For instance, dual connectivity mode may refer to when one UE has two radio connections with two access points, for example, one macro and one small cell EnodeB (eNB).

The master cell group may comprise a single cell. The master cell group may comprise a plurality of cells. The master cell/master cell group may provide a control plane connection between the UE and the core network. The secondary cell group may comprise a single cell. The secondary cell group may comprise a plurality of cells. The secondary cell/secondary cell group may provide a user plane (e.g., data) connection between the UE and the core. At any one time, one (i.e., a single) cell of the secondary cell group may be denoted as a primary secondary cell of the secondary cell group. The primary secondary cell of the secondary cell group (PSCell) may be the cell, operating on the primary frequency, in which the UE either performs the initial RRC connection establishment procedure or initiates the RRC connection re-establishment procedure, or the cell indicated as the primary cell in the handover procedure. The PSCell may provide measurement configurations to a UE for configuring the UE to perform measurements on different frequencies. Any non-PSCells (when available) of the secondary cell group may provide additional resources for carrier aggregation.

CPC is a PSCell change procedure that is executed only when PSCell execution condition(s) are met.

In more detail, when a CPC for a source PSCell is configured in the UE by an MN using an RRCReconfiguration message, the UE maintains a connection with the source PSCell after receiving the CPC configuration and starts evaluating the CPC conditions for candidate PSCell(s) comprised in the RRCReconfiguration message. A network can configure a UE with up to 8 candidate PSCell configuration(s) with associated execution condition(s). If at least one CPC candidate PSCell satisfies the corresponding CPC execution condition, the UE detaches from the source PSCell, applies the stored corresponding configuration for the selected candidate PSCell and synchronises to that candidate PSCell. The UE completes the CPC execution procedure by either signalling the MN with an embedded RRCReconfigurationComplete message for forwarding to the new PSCell (i.e., to the selected candidate PSCell), or by sending the RRCReconfigurationComplete message directly to the new PSCell.

3GPP refers to a group of organizations that develop and release different standardized communication protocols. 3GPP develops and publishes documents pertaining to a system of “Releases” (e.g., Release 15, Release 16, and beyond).

3GPP Release 16 specified conditional PSCell for intra-secondary node (SN) scenarios. In particular, Release 16 introduced conditional NR PSCell addition/change for any architecture option with NR PSCell, but is limited to intra SN change without Master node (MN) involvement.

CPC was extended in Release 17 for inter-SN scenarios. Inter-SN CPC may be initiated by a master node (MN) and/or by an SN.

Figure 6:
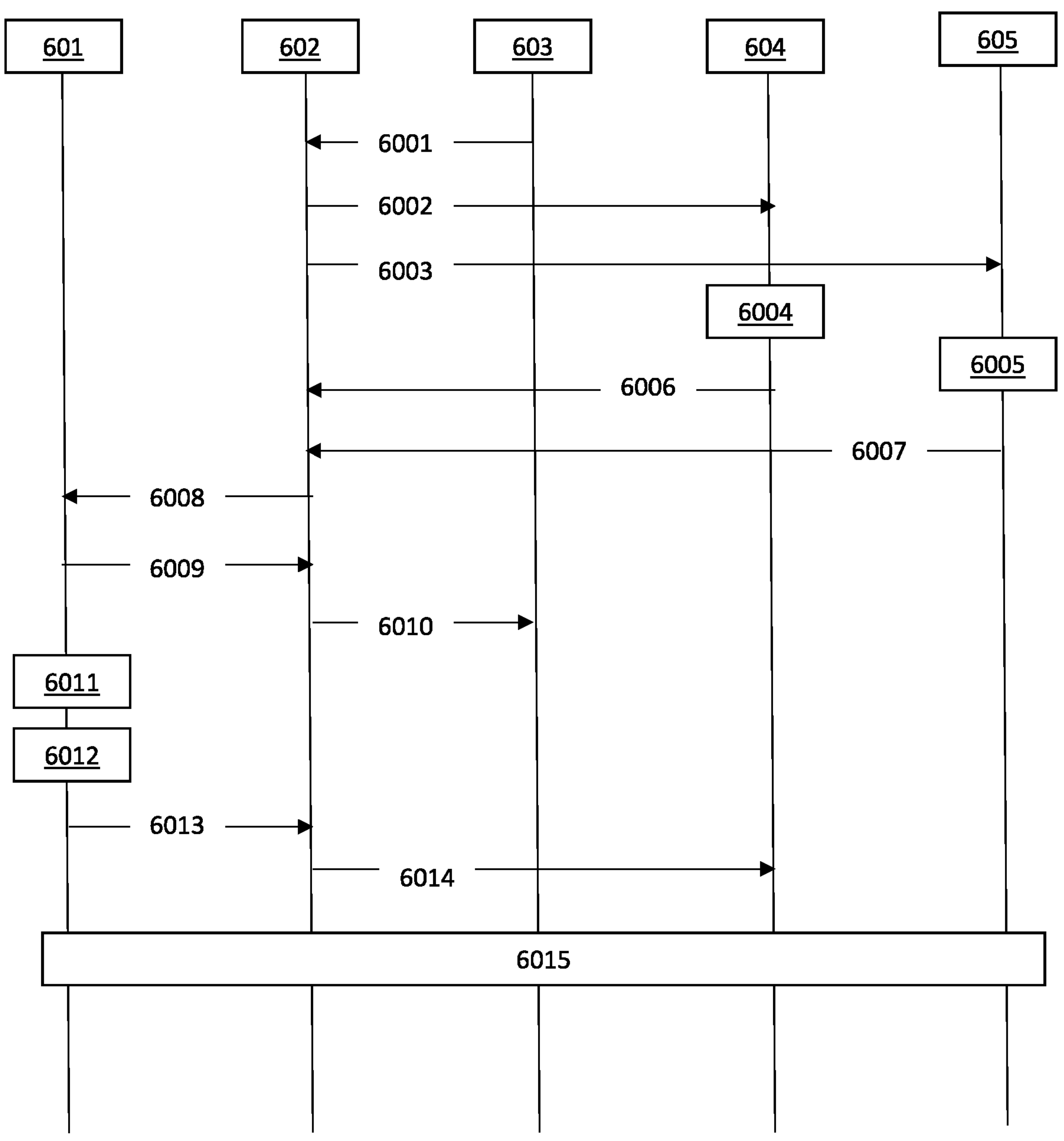
FIG. 6 illustrates call signalling.

SN-initiated CPC is illustrated with respect to FIG. 6.

FIG. 6 illustrates example signalling between a UE 601, a master node 602, a source SN 603, a first target SN 604, and a second target 605.

During 6001, the source SN 603 signals the MN 602. This signalling may indicate that a change in SN and/or an SgNB is requested by the Source SN 603. This signalling may comprise at least one identifier for at least one target SN (e.g., the first and second target SNs) to be targeted for preparing a target PSCell. The source SN 603 may comprise, in the signalling of 6001, a list of PSCell(s) to be prepared by each target SN, and/or provide a CPC execution condition for each listed target PSCell. The CPC execution condition refers to a measurement identifier in a measurement configuration that is provided by the initiating node (the source SN in this case). In general, a measurement configuration may be considered as being used by the UE to set parameters for cell measurements to be performed by the UE.

During 6002 and 6003, the MN 602 signals each of the target SNs comprised in the signalling of 6001.

During 6002, the MN 602 signals the first target SN 604. This signalling of 6002 may comprise a request to add the first target SN 604. The addition request of 6002 may request that the first target SN determines a list of PSCell(s) to prepare (considering a maximum number indicated by the MN in the addition request) and, for each prepared PSCell, that the first target SN determines Secondary Cell Group (SCG) Secondary Cells (SCells) and provides the corresponding SCG radio resource configuration to the MN in an NR RRCReconfiguration message. The first target SN 604 can either accept or reject each of the candidate cells listed within the measurement results indicated by the MN, i.e. the first target SN 604 cannot configure any alternative candidates.

During 6003, the MN 602 signals the second target SN 605. This signalling of 6003 may comprise a request to add the second target SN 604. The addition request of 6003 may request that the second target SN determines a list of PSCell(s) to prepare (considering a maximum number indicated by the MN in the addition request) and, for each prepared PSCell, that the second target SN determines Secondary Cell Group (SCG) Secondary Cells (SCells) and provides the corresponding SCG radio resource configuration to the MN in an NR RRCReconfiguration message. The second target SN 605 can either accept or reject each of the candidate cells listed within the measurement results indicated by the MN, i.e. the second target SN 605 cannot configure any alternative candidates.

During 6004 and 6005, the first and second target SNs respectively decide on candidate target PSCells to prepare.

During 6006, the first target SN responds to the signalling of 6002. This response may comprise an acknowledgement of the request of 6002. This signalling may comprise respective CPC configurations for each target cell prepared during 6004, in addition to at least one identifier of the prepared target cells of 6004. This signalling of 6006 may thus comprise configuration information in respect of any PSCell prepared by the first target SN 604.

During 6007, the second target SN responds to the signalling of 6003. This response may comprise an acknowledgement of the request of 6003. This signalling may comprise respective CPC configurations for each target cell prepared during 6005, in addition to at least one identifier of the prepared target cells of 6005. This signalling of 6007 may thus comprise configuration information in respect of any PSCell prepared by the second target SN 605.

During 6008, the MN 602 signals the UE 601. This signalling of 6008 may comprise a conditional (re-)configuration of the UE that comprises the CPC configurations of the candidate target PSCell(s) received during 6006 and 6007). The signalling of 6008 may comprise the CPC execution conditions received during 6006 and 6007. In other words, the MN 602 may provide the UE with a CPA configuration, i.e. a list of RRCConnectionReconfiguration messages and associated execution conditions, in which each RRCConnectionReconfiguration* message contains the SCG configuration in the RRCReconfiguration** message received from the first and second target SN nodes.

During 6009, the UE 601 signals the MN 602. This signalling of 6009 may comprise an acknowledgement of the signalling of 6008. This signalling of 6009 may comprise an indication that the conditional (re-)configuration of the UE 601 has been completed.

During 6010, the MN 602 signals the source SN 603. This signalling of 6010 may indicate that the UE 601 has been prepared for a change in SN from the source SN to at least one of the target SNs.

During 6011, the UE 601 evaluates the CPC execution conditions of the prepared target PSCell(s) that were received during 6008 in order to determine whether or not at least one CPC execution condition has been fulfilled.

During 6012, the UE 601 determines that at least one CPC execution condition has been met. For the purpose of the present example, it is assumed that the at least one CPC execution condition that has been met is for a PSCell candidate in the first target SN 604.

During 6013, and in response to the positive determination of 6012, the UE 601 signals the MN 602. This signaling of 6013 may indicate that said at least one CPC execution condition for the PSCell candidate in the first target SN 604 has been met. The signalling of 6013 may comprise an embedded RRC_ReconfigurationComplete message, which indicates that the radio resource control of the UE has been successfully reconfigured.

During 6014, the MN 602 signals the first target node SN 604. This signalling of 6014 may comprise the RRC_ReconfigurationComplete message. The signalling of 6014 may indicate to the first target SN 604 that the UE 601 will be using at least one of the target PSCells prepared by the first target SN 604.

During 6015, the UE completes random access for accessing the prepared target PSCell associated with the fulfilled execution criteria of 6012.

In accordance with the aim of 3GPP Release 17, the entity that initiates the CPC procedure is responsible for deciding on the list of target PSCells that may be prepared along with its corresponding CPC execution conditions.

However, the target SN cannot prepare more PSCells beyond a maximum number of PSCells that is determined (and sent by) the initiating node (Source SN). Likewise, in the SN-initiated inter-SN CPC, the source SN is responsible for setting the execution condition for each target PSCell that can possibly be prepared.

Figures 7A, 7B:
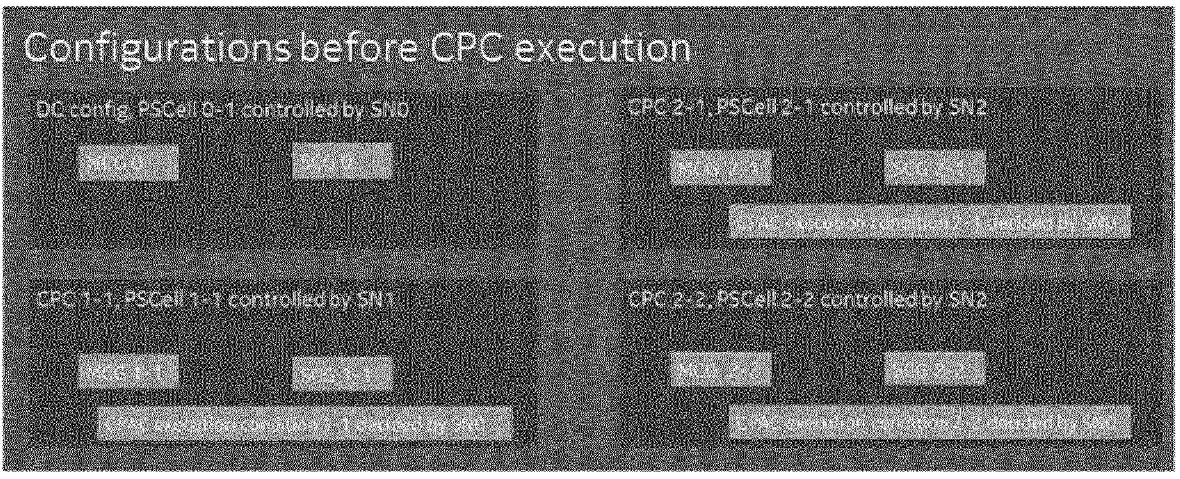
FIGS. 7A and 7B illustrate example measurement configurations.

FIG. 7A illustrates one example of a source SN preparing three CPCs for a UE. In particular, FIG. 7A illustrates CPC configurations prepared by a source SN for SN initiated inter-SN condition PSCell change.

In the example of FIG. 7A, a UE is currently being served by PSCell 0-1 (the first index 0 indicates an identifier of the SN controlling the PSCell currently serving the UE, and the second index 1 indicates an identifier of the PSCell in the SN. In other words, PSCell 1 of SN 0 (i.e., the source SN) is indicated as PSCell 0-1).

The radio access network (RAN) node controlling the serving PSCell 0-1 of the UE may trigger the preparation of three target PSCells, each of which being associated with a respective CPC configuration: CPC 1-1 represents the configuration for prepared target PSCell 1-1 from SN1 (i.e., a first SN), CPC 2-1 represents the configuration for prepared target PSCell 2-1 from SN2 (i.e., a second SN), and CPC 2-2 represents the configuration for PSCell 2-2 from SN2. SN0 specifies the CPC execution condition for each prepared target cell and provides a measurement configuration for evaluating the CPC execution condition.

The parameters of the CPC execution condition can be set differently with respect to each prepared target cell. This is because the radio conditions between the source PSCell 0-1 and the prepared target PSCells may be different. For example, the CPC 1-1 execution condition, which is used by the UE to decide on the CPC execution from PSCell 0-1 to PSCell 1-1, can be different from CPC execution condition used to decide on the change from PSCell 0-1 to PSCell 2-1 or from PSCell 0-1 to PSCell 2-2. From mobility robustness and configuration flexibility point of views, the parameters of the CPC execution conditions may be configured to be specific for a source and target PSCell pair.

Further, as mentioned above, the measurement configuration is set by SN0 in the SN-initiated conditional PSCell change procedure. This means that no other network node is aware of the measurement configuration and/or of the CPC execution that is set by SN0 with respect to the target PSCells. Even when an MN is in the same radio access technology as the source SN, the MN is not configured to decode the configuration sent by the SN.

3GPP Release 17 further mandates that once the CPC procedure is executed successfully, the UE releases all stored CPC configurations (see, for example, 3GPP TS 37.340). This means that a UE releases all stored conditional reconfiguration after successfully executing a CPC procedure following an execution procedure being met.

3GPP Release 18 has set a new objective for specifying mechanisms and procedures of new radio dual connectivity (NR-DC) that enable selective activation of the cell groups via layer 3 (i.e., network layer) enhancements for allowing subsequent cell group change after changing a cell group without reconfiguration and re-initiation of Conditional PSCell Change (CPC) and/or Conditional PSCell Addition (CPA).

This new objective is likely to result in a change to SCG without re-configuration and re-initiating of CPC/CPA preparation which implicitly indicates that the pre-configured CPC configuration should be maintained after CPC execution.

Maintaining CPC configurations after CPC execution has several issues.

For example, after the UE executes CPC towards one of the target PSCells that the UE is configured for, the UE will have to maintain the other CPC configurations received for the other target PSCells. This is illustrated with respect to FIG. 7B, which shows configurations to be maintained by the UE after CPC execution.

In FIG. 7B, the UE is assumed to have executed CPC towards PSCell 1-1, and SN1 becomes the serving SN for PSCell 1-1.

Subsequent to this change, SN1 is not aware of other prepared target PSCells (as these were prepared by the original source SN, SN0). As such, SN1 cannot maintain a list of prepared target cells (for, for example, add, release, and update PSCell operations), and cannot initiate early data forwarding to a target PSCells. Early data forwarding relates to sending data for a UE to candidate cells prior to any of those candidate cells providing data connectivity to the UE. In this way, the candidate cells may have data ready for the UE in the event the UE switches to that candidate cell.

Moreover, in the simplest extension to enable the above-mentioned objective for Release 18, the UE may attempt to retain and use Release 17—defined CPC configurations for future SN cell changes. This would require the UE to continue to evaluate the CPC executions that have been configured by previous SN0 before the CPC execution to SN1. These conditions are defined by SN0 and are in relation to SN0 (i.e., the CPC execution conditions, configured by SN0, are for CPC from source PSCell 0-1 towards target PSCell 2-1 and PSCell 2-2).

However, after CPC execution to SN1, these CPC execution condition that are evaluated by the UE are not necessarily convenient/optimal for deciding on the change from the new serving PSCell 1-1 (controlled by SN1) to other target PSCell 2-1 and PSCell 2-2. As a result, the robustness of CPC change might be affected and may result in failure.

Likewise, CPC conditions are tied to a measurement identifier that is unknown by the new serving PSCell. As such, the serving PSCell may reconfigure the UE and overwrite some of these measurement identifiers, which leaves the UE without any valid condition for triggering CPC.

Conditional Handover (CHO) is a conditional cell change for a Master Cell Group. The configuration for effecting CHO may be maintained by a source gNB or Master Node in case of dual-connectivity. The CHO configuration may be maintained after CHO execution. To achieve this, there is provided a CHO Request that indicates a list of candidate cells and a CHO request ACK that contains a CHO execution condition set that is applied by the UE after performing CHO execution.

Figure 8:
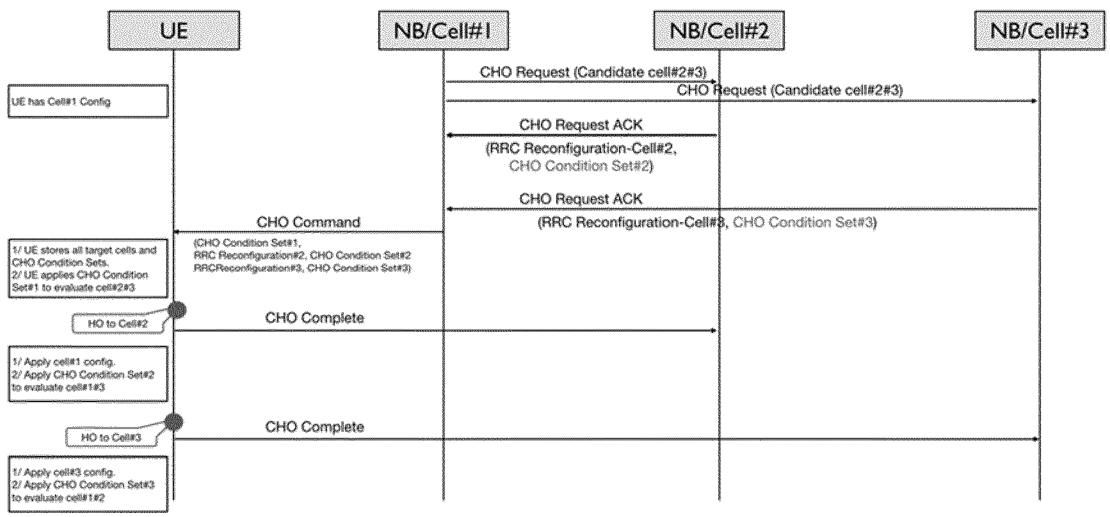
FIG. 8 illustrates call signalling.

The signalling for this is illustrated with respect to FIG. 8, which shows a UE applying CHO condition set #2 of cell 2 and applying a CHO condition set #3 of cell 3 before and after performing CHO to cell 2 and 3, respectively. The CHO execution condition set #2 of cell 2 contains the CHO execution conditions from cell 2 to cell 1 and from cell 2 to cell 3. The same logic applies for CHO execution condition set #3, i.e., contains the CHO execution conditions from cell 3 to cell 1 and from cell 3 to cell 2.

However, this procedure is specified for CHO of MCG and cannot be applied to Secondary Cell group (SCG) cases where SN is considered in dual connectivity.

Further, in this example of FIG. 8, the target gNBs, controlling the prepared target cells, provides CHO execution conditions to other prepared target cells during CHO preparation, which causes high signaling overhead each time a new cell is prepared by the source gNB or a prepared cell is released or replaced. This is because, in each of these cases, the source gNB needs to fetch the updated CHO execution condition set from each prepared target gNB.

In another mechanism, a source MN informs a target SN about prepared cells after a CPC execution. However, as it takes time to inform the target SN about the prepared cells and the target SN takes some time to re-configure the UE for the execution condition of the CPC, radio failures may happen in between as the UE wouldn't have any configuration for the CPC. Moreover, additional signalling is performed each time the UE performs CPC, which adds signalling overhead to the system.

In another mechanism, a source MN informs a target SN about each preparation during CPC preparation. However, each time a (new) SN is added (e.g., prepared) or modified, all other target SNs have to be notified and involved. This will use a high amount of Xn signalling and additional delay for each new preparation or modification, which adds signalling overhead to the system.

The following aims to address at least one of the above-mentioned issues.

The following discloses new mechanisms for enabling a UE to maintain a persistent measurement configuration after an RRC Reconfiguration operation resulting from a PSCell change. The maintenance of measurement configuration enables UE to subsequently switch cells using this persistent measurement configuration. The following further provides network tools for maintaining the persistent measurement configuration.

The following discusses three examples for illustrating the present disclosure.

In a first example, a source SN indicates to a target SN (via, for example, a source MN) a measurement identifier range that is associated with a persistent CPC configuration. The target SN does not use this measurement identifier range for an initial CPC configuration within its own measurement configuration. The source MN further provides the UE with a delta measurement configuration to be applied to the target measurement configuration after the target cell configuration is applied. The UE applies this measurement configuration right after CPC execution. The UE may further retain this measurement configuration to apply a subsequent CPC. The UE may indicate to the target SN that the persistent measurement configuration is being used. This may be indicated by providing, for example, a measurement configuration comprising: a measurement identifier, a measurement object, and a reporting configuration for a persistent CPC configuration.

In general, a measurement configuration may configure a UE in regards to: when to perform measurements, what to measure (i.e., a measurement object), how to evaluate when to report the measurements, and what to include in the measurement report.

As mentioned above, measurement objects may be considered as objects on which the UE performs measurements. For example, for intra-frequency and inter-frequency measurements a measurement object may be a single carrier frequency. For inter-RAT measurements, a measurement object may be a set of cells on a single carrier frequency. For inter-RAT measurements, a measurement object may be a set of carrier frequencies.

Each reporting configuration may comprise at least one Reporting Criterion and a Reporting Format. The Reporting Criterion is the criterion that triggers the UE to send a measurement report (and may be either periodical or a single event description). The Reporting Format may specify the quantities that the UE includes in the measurement report and associated information (e.g., number of cells to report).

Measurement identifiers link measurement objects with a respective reporting configuration. By configuring multiple measurement identifiers, it is possible to link more than one measurement object to the same reporting configuration, as well as to link more than one reporting configuration to the same measurement object. The measurement identifier may be used as a reference number in the measurement report.

The target SN may re-configure the persistent CPC configuration in response to receipt of this persistent measurement configuration.

Figure 9:
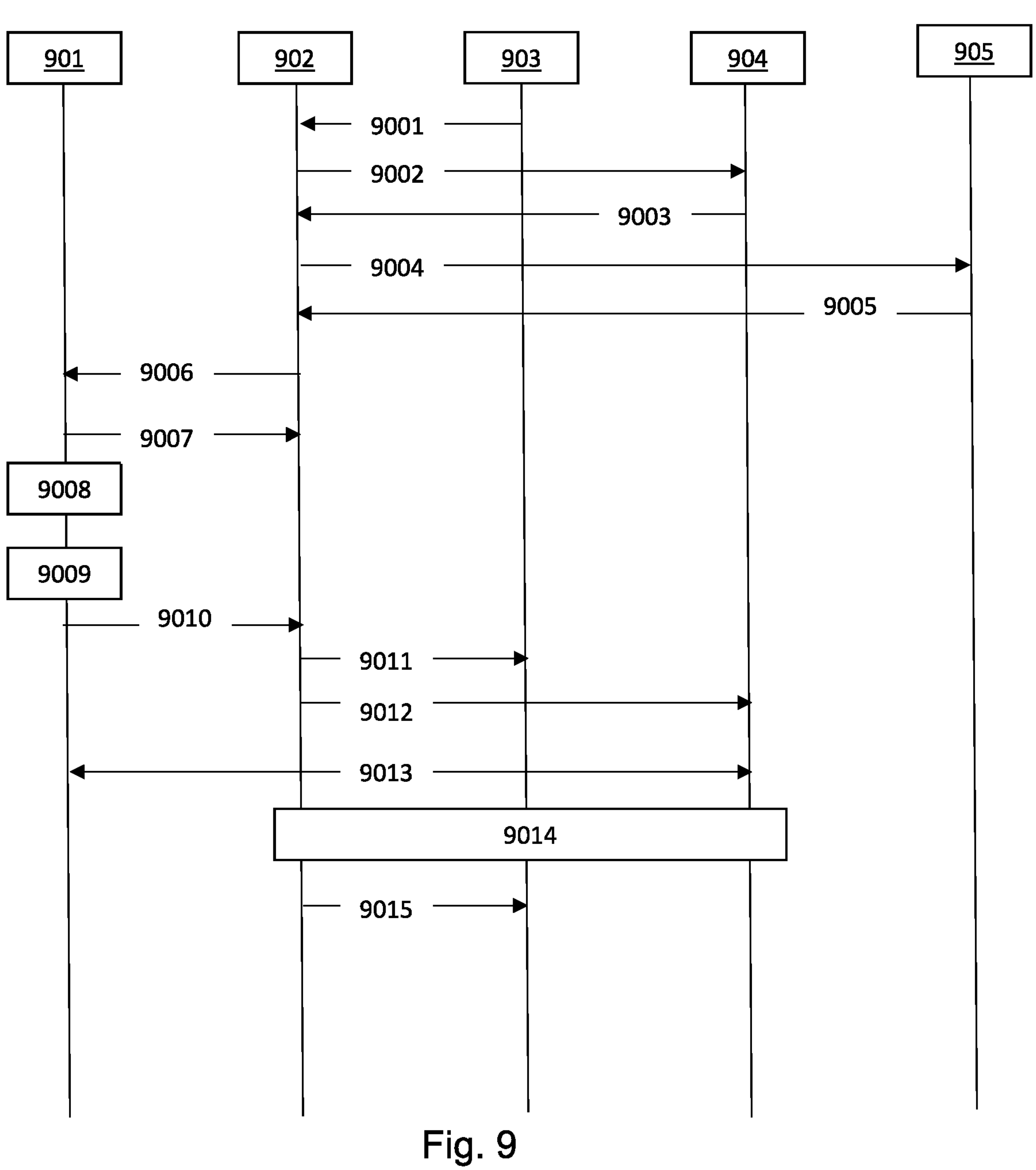
FIGS. 9 to 11 illustrate example call signalling.

This is further illustrated with respect to FIG. 9.

FIG. 9 illustrates signalling that may be performed between a UE 901, a source MN 902, a source SN 903, a first target SN 904, and a second target SN 905. The Source SN 903 may be labelled as SN-0, and be configured to provide PSCell 0-1. The first target SN 904 may be labelled as SN-1, and be configured to provide PSCell 1-1. The second target SN 905 may be labelled as SN-2, and be configured to provide PSCell 2-1 and/or PSCell 2-2.

During 9001, the source SN 903 signals the source MN 902. This signalling of 9001 may request an SN change. This signalling of 9001 may comprise an association between the PSCell's provided by the first and second target SN's and a respective measurement identifier. For example, the signalling of 9001 may indicate that PSCell 1-1 is associated with a first measurement identifier, that PSCell 2-1 is associated with a second measurement identifier, and that PSCell 2-2 is associated with a third measurement identifier. In contrast to previous systems, the SN change request of 9001 may comprise a range of measurement identifiers (e.g., first to eighth measurement identifiers) that are associated with a first CPC. In other words, the Source SN 903 may indicate a measurement configuration to the source MN 902 that comprises a measurement identifier range. The measurement identifier range may be considered to form a set (which may comprise two or more in said set) of measurement identifier values that are used for CPC and that remain valid after CPC execution. This measurement identifier range may indicate measurement identifiers only for CPCs that are available at the time of SN addition, or may indicate measurement identifiers for future CPCs. This measurement identifier range may comprise a range of measurement identifiers that are configurable and deconfigurable by the source SN.

During 9002, the source MN 902 signals the first target SN 904. This signalling of 9002 may comprise a request to add an SN. This signalling of 9002 may comprise an indication of the measurement identifier range.

Responsive to the measurement identifier range information being received from the source MN 902 during 9002, the first target SN 904 does not configure any measurement identifier in the measurement identifier range comprised in the signalling received during 9002 as part of a measurement configuration of the first target SN 904.

During 9003, the first target SN 904 responds to the signalling of 9002. This response of 9003 may comprise an acknowledgement. This response of 9003 may comprise an acknowledgement of the SN addition request of 9002.

The signalling of 9003 may comprise measurement configurations having measurement identifier values that are different to those included in the measurement identifier range indicated during 9002.

During 9004, the source MN 902 signals the second target SN 905. This signalling of 9004 may comprise a request to add an SN. This signalling of 9004 may comprise an indication of the measurement identifier range.

Responsive to the measurement identifier range information being received from the source MN 902 during 9004, the second target SN 905 does not configure any measurement identifier in the measurement identifier range comprised in the signalling received during 9004 as part of a measurement configuration of the second target SN 905.

During 9005, the second target SN 905 responds to the signalling of 9004. This response of 9005 may comprise an acknowledgement. This response of 9005 may comprise an acknowledgement of the SN addition request of 9004.

The signalling of 9005 may comprise measurement configurations having different measurement identifier values to those included in the measurement identifier range indicated during 9004.

The indication of the measurement range may indicate a range of measurement identifiers that are not to be used (at least initially) by the first and second target SNs 904, 905. The measurement range is provided by the source SN controlling the serving PSCell 903 during 9001, and is provided to the first and second target SNs during 9002 and 9004 respectively. Although these measurement identifiers are not used as part of the measurement configurations provided by the first and second target SNs during 9003 and 9005, it is understood that the first and/or second target SN may use these measurement identifiers at a later time.

During 9006, the source MN 902 signals the UE 901. The signalling of 9006 may comprise an RRC reconfiguration request message for causing the UE to reconfigure itself. The signalling of 9006 may comprise a new measurement configuration information element. The new measurement configuration may be labelled herein as "measIdtoAddModListAfterCPC". The "measIdToAddModListAfterCPC" measurement configuration may be considered to comprise a measurement configuration comprising measurement objects and measurement identifiers related to the conditional configurations that are to be maintained after CPC execution.

The new measurement configuration may comprise CPC configurations that are received from the first and second target nodes during 9003 and 9005. The new measurement configuration may comprise the measurement configuration indicated by the source SN. The signalling of 9006 may indicate to the UE 901 to apply the signalled configuration associated with a particular CPC execution criteria when that particular CPC execution criteria has been fulfilled. In other words, this signalling of 9006 may indicate to the UE 901 to apply the signalled configuration associated with a CPC execution criteria of a target cell after switching from the source cell to the target cell.

On receipt of the signalling of 9006, the UE may evaluate a plurality of measurement configurations associated with respective identifiers for determining whether to perform CPC execution towards the different PSCells. For example, the UE may evaluate "meas ID 1" to decide on CPC execution towards PSCell 1-1, "meas ID 2" to decide on CPC execution towards PSCell 2-2, and/or "meas ID 3" to decide on CPC execution towards PSCell 2-2. This evaluation may be performed irrespective of the ID of the serving PSCell. The remaining measurement identifiers comprised in the measurement range identifier (e.g., Meas ID 4-8) may be reserved in case new PSCells are prepared.

During 9007, the UE acknowledges the signalling of 9006. The signalling of 9007 may acknowledge receipt of the new configuration. The signalling of 9007 may comprise an RRCReconfigurationComp message.

During 9008, the UE 901 determines that at least one CPC condition to one of the PSCells has been fulfilled. For example, in the present case, the UE may determine that the CPC condition towards PSCell 1-1 in SN-1 holds and determines to initiate PSCell change procedure towards SN-1. The UE determines to apply a measurement configuration of the PSCell 1-1.

During 9009, the UE 901 applies the measIdToAddModListAfterCPC and appends this to the measurement configuration of the PSCell 1-1.

During 9010, the UE 901 signals the source MN 902. This signalling of 9010 may comprise an indication that the UE 901 has completed a PSCell change procedure. The signalling of 9010 may indicate that the UE 901 has completed an RRC reconfiguration. For example, the signalling of 9010 may comprise an RRCReconfiguration complete signalling operation. The signalling of 9010 may comprise an indication to the effect that the UE 901 will be applying a measurement configuration configured by the source MN 902 during 9006.

In one example, during 9010, the UE 901 reports only the measurement ID of the configuration that is used for PSCell change (i.e., MeasID 1 for CPC from PSCell 0-1 to PSCell 1-1 in the present example). This is because the measurement configuration given in MeasID 1 cannot be used by the UE when it is already in PSCell 1-1 and the new serving PScell (e.g., PSCell 1-1) can reuse the Measurement identifier associated with this PSCell. For the measurement configuration of other CPCs, the UE 901 may reuse the Measurement identifiers configured by the source SN and the target SN does not re-configure the UE.

During 9011, the source MN 902 signals the source SN 903. This signalling of 9011 may indicate that the SN has changed for the UE 901.

During 9012, the source MN 902 signals the first target node 904. This signalling of 9012 may comprise an indication that an SN reconfiguration has been completed by the UE for the PSCell 1-1. This signalling of 9012 may comprise the Measurement identifiers and objects for CP signalled by the UE 901 during 9010.

During 9013, the UE 901 may signal the first target node 904. This signalling of 9013 may a Random Access Channel procedure for accessing PSCell 1-1.

During 9014, the source MN 902, source SN 903, and first target SN 904 conduct a user plane procedure. A user plane procedure may be considered to comprise data plane communications of the UE. The data plane is related to the applications used by the UE for various services. Therefore, a user plane is initiated/established between the UE 901 and a network entity in order to receive and/or provide a service. 9014 is performed to avoid service interruption to the UE 901 as at least one cell providing data connectivity to the UE 901 is changed.

During 9015, the source MN 902 signals the source SN 903. This signalling of 9015 may instruct the source MN 902 to release any UE context retained by the source SN 903 in respect of the UE 901.

It is understood that although example of FIG. 9, the source SN 903 determines and provides the source MN with the measurement identifier range 1 to 8, that another entity may determine this range. For example, the source MN may decide on measurement identifiers 1 to 8 for CPC during 9002 instead of the source SN. This may be especially useful with the CPC is MN-initiated.

Figure 10:
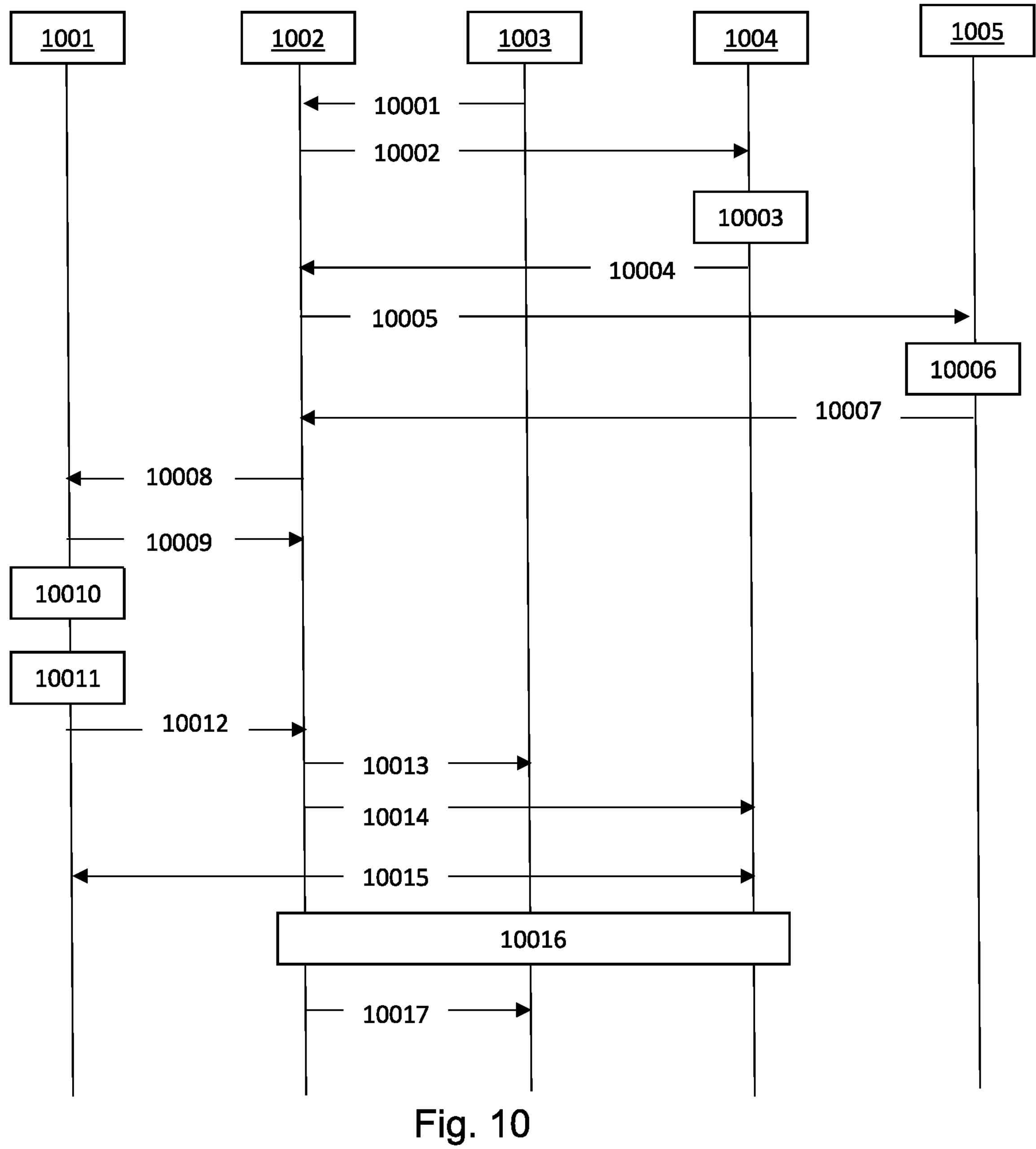

A second example is illustrated with respect to FIG. 10. In this example of FIG. 10, a source MN indicates to a target SN a measurement configuration for the persistent CPC configuration. The measurement may comprise, for example, a measurement identifier, an object, and a reporting configuration for the persistent CPC configuration. The target SN may then integrate this information into the target SN's measurement configuration. As the measurement configuration becomes part of target SN's measurement configuration, the UE may apply this measurement configuration and start evaluating the condition for a subsequent CPC immediately.

In other words, in this second example, the source measurement configuration for CPC survival will continue after execution from the UE side. As the target SN already knows these measurement-ID during preparation, the target SN may ensure that these measurement identifiers are not assigned for any new measurement-configurations for different purpose.

FIG. 10 illustrates signalling that may be performed between a UE 1001, a source MN 1002, a source SN 1003, a first target SN 1004, and a second target SN 1005. The source SN 1003 may be labelled as SN-0 and be configured to provide PS Cell 0-1. The first target SN 1004 may be labelled as SN-1 and be configured to provide PS Cell 1-1. The second target SN 1005 may be labelled as SN-2, and be configured to provide PS Cell 2-1 and PS Cell 2-2.

During 10001, the source SN 1003 signals the source MN 1002. This signalling of 10001 may comprise an indication that a change in SN is requested. Receipt of this signal by the source MN 1002 may initiate an SN-initiated Conditional PSCell change procedure. This signalling of 10001 may comprise a list of PSCells, and measurement configurations (including measurement objects, and reporting configuration configured to the UE for CPC).

For example, the signalling of 10001 may associate: PSCell 1-1 with a measurement identifier meas ID 1, PSCell 2-1 with a measurement identifier meas ID 2, PSCell 2-2 with a measurement identifier meas ID 3, PSCell 0-1 with a measurement identifier meas ID 4. The signalling of 10001 may comprise a range of measurement identifiers (i.e., meas ID 1-4 in the present example) that are associated with the CPC.

During 10002, the source MN signals the first target SN 1004. This signalling of 10002 may comprise an SN addition request. This signalling of 10002 may comprise an indication of the prepared PS Cell. The signalling of 10002 may comprise an indication that the range of measurements identifiers Meas IDs 1 to 4 are associated with the CPC configured at the UE 1001. The signalling of 10002 may comprise measurement objects associated with these measurement identifiers.

During 10003, the first target SN 1004 integrates measurement identifiers received during 10002 (and any associated measurement objects) into the first target SN's own measurement configuration.

During 10004, the first target SN 1004 signals the source MN 1002. The signalling of 10004 may acknowledge the SN addition request of 10002. The signalling of 1007 may comprise an indication of the integration of 10003.

During 10005, the source MN signals the second target SN 1005. This signalling of 10005 may comprise an SN addition request. This signalling of 10005 may comprise an indication of the prepared PS Cell. The signalling of 10005 may comprise an indication that the range of measurements identifiers Meas IDs 1 to 4 are associated with the CPC configured at the UE 1001. The signalling of 10005 may comprise measurement objects associated with these measurement identifiers.

During 10006, the second target SN 1005 integrates measurement identifiers received during 10005 (and any associated measurement objects) into the first target SN's own measurement configuration.

During 10007, the second target SN 1005 signals the source MN 1002. The signalling of 10007 may acknowledge the SN addition request of 10005. The signalling of 1007 may comprise an indication of the integration of 10006.

During 10008, the source MN 1002 signals the UE 1001. This signalling of 10008 may comprise an instruction to the UE 1001 to perform an RRC reconfiguration. The signalling of 10008 may comprise an RRCReconfiguration message. The signalling of 10008 may comprise CPC configurations received from the first and second target SNs during 10004 and 10007.

During 10009, the UE 1001 signals the source MN 1002. This signalling of 10009 may indicate to the source MN 1002 that the UE has reconfigured its measurement objects in accordance with the signalling of 10008.

During 10010, the UE 1001 monitors CPC execution conditions configured by PS Cell 0-1 (i.e., configured by the source SN 1003.

During 10011, the UE 1001 determines that a CPC condition towards PS Cell 1-1 in the first target SN 1004 has been fulfilled, and that the UE should consequently execute a CPC towards the first target SN 1004.

10012 to 10017 relate to a CPC procedure being completed.

During 10012, the UE 1001 signals the source MN 1002. This signalling of 10012 may indicate that the UE 1001 is applying the measurement configuration of PSCell 1-1. This signalling may be indicated via an RRC reconfiguration signal.

During 10013, the source MN 1002 signals the source SN 1003. This signalling of 10013 may indicate that the SN has changed for the UE 1001.

During 10014, the source MN 1002 signals the first target node 1004. This signalling of 10014 may comprise an indication that an SN reconfiguration has been completed by the UE for the PSCell 1-1.

During 10015, the UE 1001 may signal the first target node 1004. This signalling of 10015 may be a Random Access Channel procedure for accessing PSCell 1-1.

During 10016, the source MN 1002, source SN 1003, and first target SN 1004 conduct a user plane procedure. The user plane procedure may be as discussed above.

During 10017, the source MN 1002 signals the source SN 1003. This signalling of 10017 may instruct the source MN 1002 to release any UE context retained by the source SN 1003 in respect of the UE 1001.

It is understood that although example of FIG. 10, the source SN 1003 determines and provides the source MN with the measurement identifier range 1 to 8, that another entity may determine this range. For example, the source MN may decide on measurement identifiers 1 to 8 for CPC during 10002 instead of the source SN. This may be especially useful with the CPC is MN-initiated.

Figure 11:
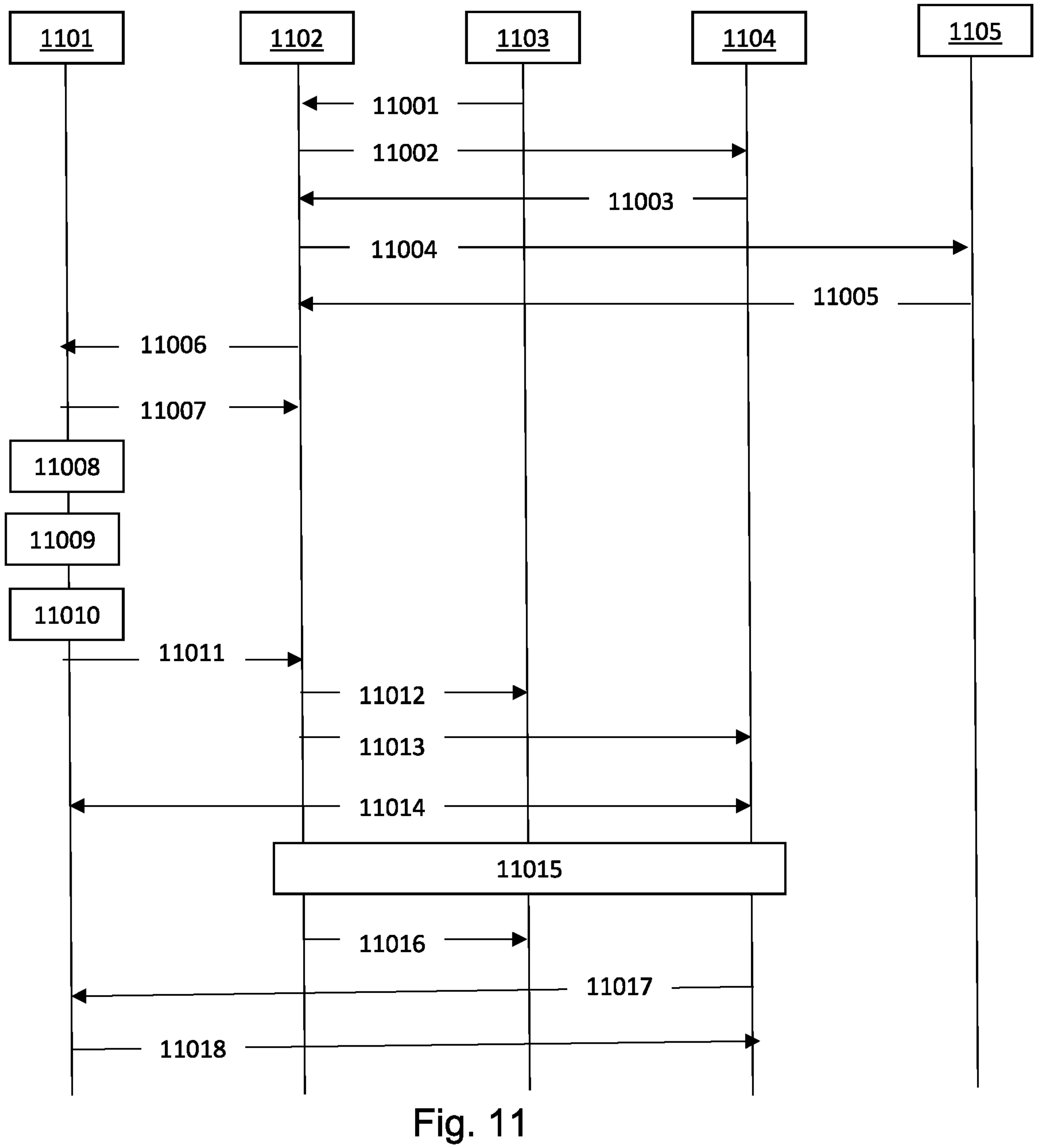

A third example is described in relation to FIG. 11.

In this third example, a source MN provides a UE with a cell independent measurement configuration to be applied right away and to be kept throughout cell changes. This means that a new measurement configuration for selective activation or CPC survival is described in this example. The UE may refer to this measurement configuration for CPC execution instead of any measurement configuration of a master cell group and/or secondary cell group.

After CPC execution, the UE releases a source SN configuration while maintaining the cell independent measurement configuration. The UE may apply this measurement configuration for subsequent CPC as the measurement configuration is kept after CPC execution. The Target SN being handed over to may release the cell independent measurement configuration or re-configure it. The existence of the cell independent measurement configuration may be part of the UE context.

FIG. 11 illustrates signalling that may be performed between a UE 1101, a source MN 1102, a source SN 1103, a first target SN 1104, and a second target SN 1105. The source SN 1103 may be labelled as SN-0 and be configured to provide PS Cell 0-1. The first target SN 1104 may be labelled as SN-1 and be configured to provide PS Cell 1-1. The second target SN 1105 may be labelled as SN-2, and be configured to provide PS Cell 2-1 and PS Cell 2-2.

During 11001, the source SN 1103 signals the source MN 1102. This signalling of 11001 may comprise an indication that a change in SN is requested. Receipt of this signal by the source MN 1102 may initiate an SN-initiated Conditional PSCell change procedure. This signalling of 1001 may comprise a plurality of respective association between PS Cells and measurement identifiers.

For example, the signalling of 11001 may associate: PSCell 1-1 with a measurement identifier meas ID 1, PSCell 2-1 with a measurement identifier meas ID 2, PSCell 2-2 with a measurement identifier meas ID 3, PSCell 0-1 with a measurement identifier meas ID 4.

During 11002, the source MN signals the first target SN 1104. This signalling of 11002 may comprise an SN addition request.

During 11003, the first target SN 1104 signals the source MN 1102. The signalling of 11003. may acknowledge the SN addition request of 11002.

During 11004, the source MN 1102 signals the second target SN 1105. This signalling of 11004 may comprise an SN addition request.

During 11005, the second target SN 1105 signals the source MN 1102. The signalling of 11005 may acknowledge the SN addition request of 11005.

During 11006, the source MN 1102 signals the UE 1101. This signalling of 11006 may comprise an instruction to the UE 1101 to perform an RRC reconfiguration. The signalling of 11006 may comprise an RRCReconfiguration message. The signalling of 11006 may comprise an instruction to retain a measurement configuration previously provided by a serving PSCell.

During 11007, the UE 1101 signals the source MN 1102. This signalling of 11007 may indicate to the source MN 1002 that the UE has reconfigured its measurement objects in accordance with the signalling of 11006.

During 11008, the UE 1101 monitors CPC execution conditions configured by PS Cell 0-1 (i.e., configured by the source SN 1103).

During 11009, the UE 1001 determines that a CPC condition towards PS Cell 1-1 in the first target SN 1104 has been fulfilled, and that the UE should consequently execute a CPC towards the first target SN 1104.

During 11010, the UE 1001 determines to retain a PSCell measurement configuration variable.

For example, the measurement configuration of a UE is part of a cell group configuration. The UE maintains the measurement configurations as a "measurement configuration variable". After UE changes cell group, the UE commonly deletes the cell group configuration and deletes the variables related to the cell group configuration. Measurement configuration variable would thus normally be one of the variables to be deleted after cell group change. However, contrary to this, during 11010, the UE 1001 retains the PSCell measurement configuration variable upon cell change.

11011 to 11018 relate to a CPC procedure being completed.

During 11011, the UE 1101 signals the source MN 1102. This signalling of 11012 may indicate that the UE 1101 is applying the measurement configuration of the serving PS Cell. This signalling may be indicated via an RRC reconfiguration signal.

During 11012, the source MN 1102 signals the source SN 1103. This signalling of 11012 may indicate that the SN has changed for the UE 1101.

During 11013, the source MN 1102 signals the first target node 1104. This signalling of 11013 may comprise an indication that an SN reconfiguration has been completed by the UE for the PSCell 1-1.

During 11014, the UE 1101 may signal the first target node 1104. This signalling of 11014 may be a Random Access Channel procedure for accessing PSCell 1-1.

During 11015, the source MN 1102, source SN 1103, and first target SN 1104 conduct a user plane procedure. This user plane procedure may be as described above.

During 11016, the source MN 1102 signals the source SN 1103. This signalling of 11016 may instruct the source MN 1102 to release any UE context retained by the source SN 1103 in respect of the UE 1101.

During 11017, the first target SN 1104 signals the UE 1101. This signaling of 11017 may comprise an instruction to the UE 1101 to release the temporary configuration variable. The signaling of 1104 may comprise new measurement CPC configurations specific for the first target SN 1104. The signalling of 11017 may comprise an RRCReconfiguration signalling. This signalling of 11017 may cause the UE to, on receipt of the signalling, perform an RRC reconfiguration.

During 11018, the UE 1101 signals the first target SN 1104. This signalling of 11018 may indicate that the UE has reconfigured its RRC operation based on the RRC configuration provided in 11017. The signalling of 11018 may comprise an RRCReconfiguration complete operation.

FIGS. 12 to 15 illustrate aspects of the above by illustrating example operations that may be performed by apparatus described herein. It is understood that these aspects highlight features of the above-mentioned examples, and that specific features the above examples may therefore be combined with the following operations.

Figure 12:
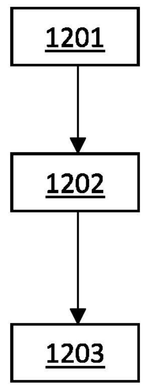
FIGS. 12 to 15 illustrate operations that may be performed by apparatus described herein.

FIG. 12 illustrates operations that may be performed by a master node operating with dual connectivity to a user equipment with a first secondary node.

During 1201, the master node determines that a primary cell of a secondary cell group is to switch from a first cell serving the user equipment, wherein the first cell is provided by the first secondary node.

During 1202, the master node determines, for a second cell provided by a second secondary node, at least one measurement configuration that will remain valid after or during a time period when the primary cell of the secondary cell group serving the user equipment switches from the first cell to the second cell.

During 1203, the master node provides the at least one measurement configuration to the user equipment.

Said determining at least one measurement configuration may comprise: identifying a measurement configuration provided by the first secondary node is to be applied by the user equipment after the user equipment switches from the first cell to the second cell; and setting the identified measurement configuration as the at least one measurement configuration.

Said determining at least one measurement configuration may comprise: determining a range of first measurement identifier values reserved for use by the first secondary node for measurement configurations associated with the first secondary node; providing the range of first measurement identifier values to the second secondary node; and receiving the at least one measurement configuration from the second secondary node, wherein the at least one measurement configuration does not comprise any measurement identifiers having an associated value falling within said range of first measurement identifier values.

Said determining at least one measurement configuration may comprise: determining a range of first measurement identifier values reserved for use by the first secondary node for associated measurement configurations; providing the range of first measurement identifier values and the associated measurement configuration to the second secondary node; and receiving the at least one measurement configuration from the second secondary node, wherein the at least one measurement configuration comprises at least one measurement identifier having an associated value falling within said range of first measurement identifier values.

Said determining that the first cell is to stop acting as the primary cell of the secondary cell group for the user equipment may comprise receiving an indication to this effect from the first secondary cell, and wherein said determining a range of first measurement identifier values comprises receiving the range of first measurement identifier values from the first secondary node.

Said determining that the first cell is to stop acting as the primary cell of the secondary cell group for the user equipment may be performed without receiving an indication to this effect from the first secondary cell, and wherein said determining a range of first measurement identifier values comprises generating the range of first measurement identifier values.

Figure 13:
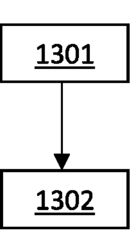

FIG. 13 illustrates operations that may be performed by a first secondary node operating with dual connectivity to a user equipment with a master node. The master node may be the master node of FIG. 12. The first secondary node may be the first secondary node discussed in relation to FIG. 12.

During 1301, the first secondary node determines that a primary cell of a secondary cell group is to switch from a first cell serving the user equipment, wherein the first cell is provided by the first secondary node.

During 1302, the first secondary node signals, to the master node, an indication that the first cell will stop acting as the primary cell of the secondary cell group, wherein the indication comprises a range of first measurement identifier values reserved for use by the first secondary node for measurement configurations associated with the first secondary node.

Figure 14:
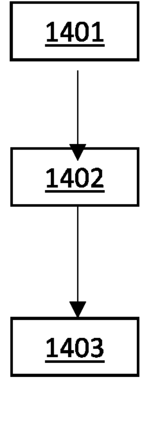

FIG. 14 illustrates operations that may be performed by a second secondary node. In the following, the master node may be the master node of FIG. 12. The first secondary node may be the first secondary node discussed in relation to FIG. 13.

During 1401, the second secondary node receives, from a master node, an indication that a primary cell of a secondary cell group is to switch from a first cell serving the user equipment, wherein the first cell is provided by the first secondary node, and wherein the indication comprises a range of first measurement identifier values reserved for use by the first secondary node for measurement configurations associated with the first secondary node.

During 1402, the second secondary node generates at least one measurement configuration for use by the user equipment in the event the user equipment starts using a cell provided by the second secondary node as the primary cell of the secondary cell group.

During 1403, the second secondary node signals the generated at least one measurement configuration to the master node.

Said generating may comprise generating the at least one measurement configuration such that it comprises a measurement identifier value falling outside of the range of first measurement identifier values.

Said generating may comprise generating the at least one measurement configuration such that it comprises a measurement identifier value falling within the range of first measurement identifier values.

Subsequent to said signalling the generated at least one measurement configuration to the master node, the second secondary node may: generate at least one second cell measurement configuration for the user equipment to apply when the primary cell of the secondary cell group is being provided by a second cell provided by the second secondary cell; and signal said generated at least one second cell measurement configuration to the user equipment when the primary cell of the secondary cell group is being provided by the second cell.

Figure 15:
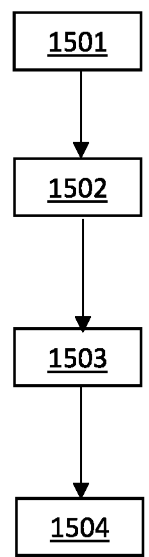

FIG. 15 illustrates example operations that may be performed by a user equipment configured to operate with dual connectivity to a master node and a first secondary node. The user equipment, master node, first secondary node and second secondary node discussed in relation to FIG. 51 may correspond to those entities described in relation to FIGS. 12 to 14.

During 1501, the user equipment maintains data connectivity with a first cell provided by the first secondary node by using the first cell as a primary cell of a secondary cell group.

During 1502, the user equipment receives, from a master node (e.g., the master node), at least one measurement configuration that may be applied by the user equipment in the event that the user equipment determines to switch the user equipment's primary cell of the secondary cell group from the first cell to a second cell provided by a second secondary node.

During 1503, the user equipment switches said primary cell of the secondary cell group from the first cell to the second cell.

During 1504, the user equipment performs measurements in the second cell in accordance with the received at least one measurement configuration.

The user equipment may: receive, from the second secondary node, at least one secondary cell measurement configuration to be applied when the primary cell of the secondary cell group is the second cell; stop said performing measurements in accordance with the received at least one measurement configuration; and initiat performing measurements in the second cell in accordance with the received at least one secondary cell measurement configuration.

The at least one measurement configuration may be independent of a second measurement configuration association with the second secondary cell.

The user equipment may receive a first measurement configuration associated with the first secondary cell; and apply the first measurement configuration only when the primary cell of the secondary cell group for the user equipment is being provided by the first cell.

The user equipment may use the at least one measurement configuration when the primary cell of the secondary cell group for the user equipment is being provided by the first cell.

The user equipment may generate a measurement configuration variable and storing the measurement configuration variable for use while the primary cell of the secondary cell group is being provided by the second cell.

The user equipment may receive an indication to release the stored measurement configuration variable from the secondary cell currently providing a cell acting as a primary cell of a secondary cell group for the user equipment.

The user equipment may: receive from the second secondary node, at least one secondary cell measurement configuration to be applied by the user equipment when the second cell is acting as the primary cell of the secondary cell group for the user equipment; and apply the received at least one measurement configuration in addition to a measurement configuration provided by the secondary node.

The user equipment may indicate measurement objects and measurement identifiers applied in the measurement configurations as part of a persistent measurement configuration configured by the master node. This may be indicated to the second secondary node via a transmission to the second secondary node.

Figure 2:
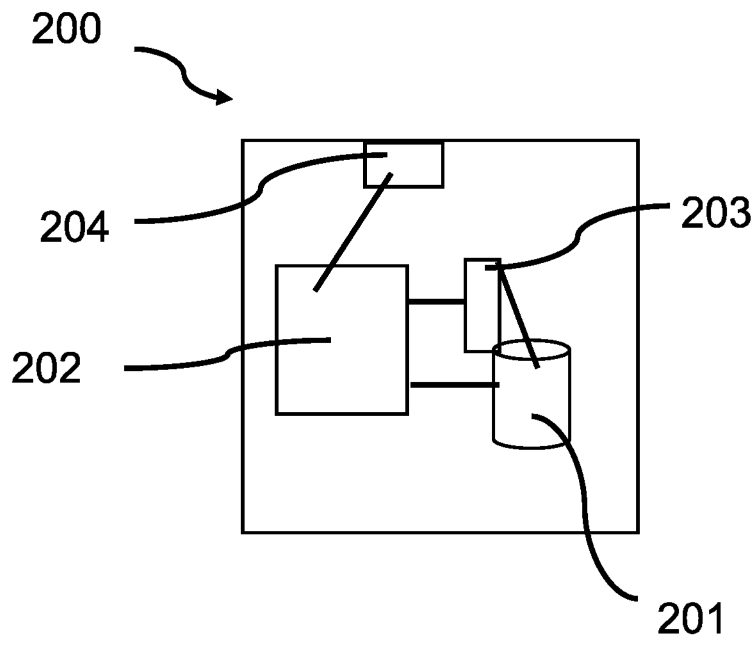
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
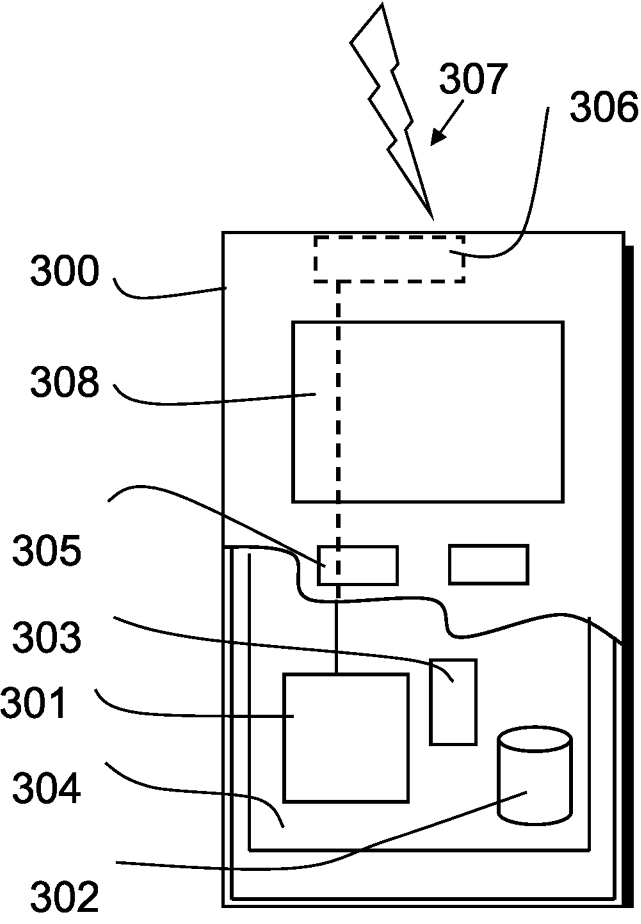
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of Tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or' wireless) to other devices and/or for connecting external accessories, for example hands-free equipment, thereto.

Figure 4:
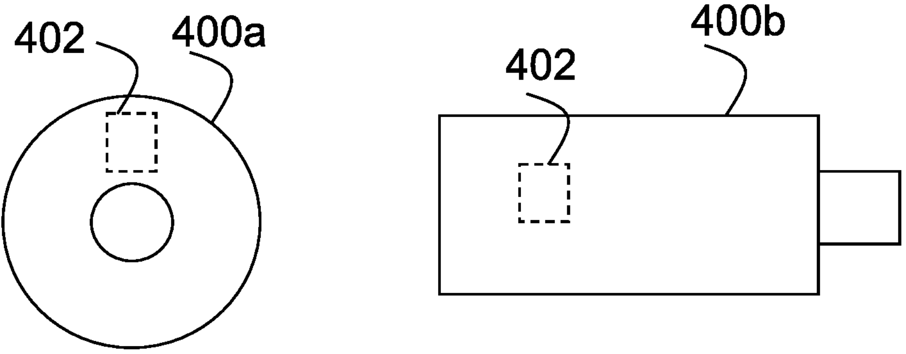
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 12 and/or FIG. 13 and/or FIG. 14 and/or FIG. 15, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 12 and/or FIG. 13 and/or FIG. 14, and/or FIG. 15, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
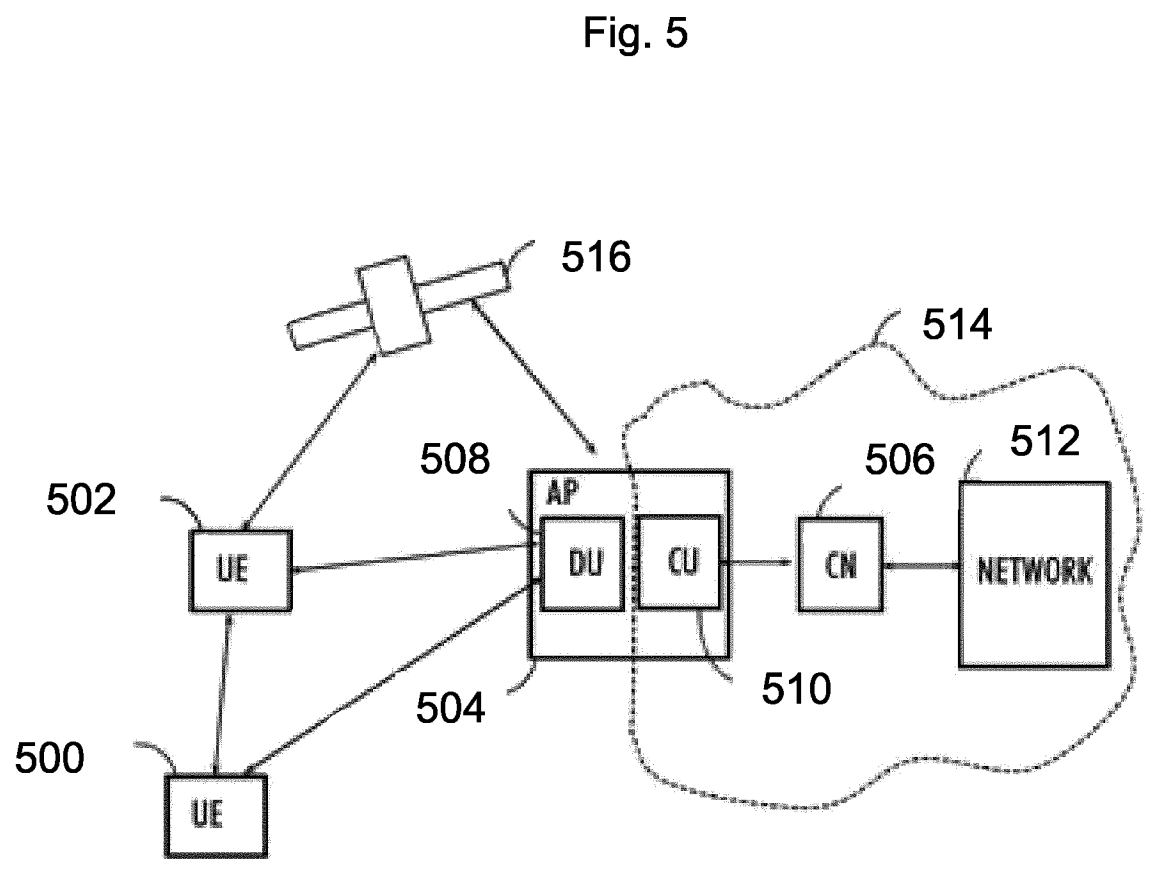

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g) NodeB serving devices in a cell. In one example, the node 504 may be a non-3GPP access node. The physical link from a device to a (e/g) NodeB is called uplink or reverse link and the physical link from the (e/g) NodeB to the device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signalling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to devices. The antenna unit may comprise a plurality of antennas or antenna elements. The (e/g) NodeB is further connected to the core network 506 (CN or next generation core NGC). Depending on the deployed technology, the (e/g) NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g) NodeBs, the device may have an access to a plurality of radio cells and the system may comprise also other apparatuses, such as physical layer relay nodes or other network elements, etc. At least one of the (e/g) NodeBs may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 5 may provide any kind of these cells. A cellular radio system may be implemented as a multilayer network including several kinds of cells.

The invention claimed is:

1. A method for a user equipment configured to operate with dual connectivity to a master node and a first secondary node, the method comprising:

maintaining data connectivity with a first cell provided by the first secondary node by using the first cell as a primary cell of a secondary cell group;

receiving, from the master node, a measurement configuration information comprising:

a first measurement configuration associated with the first secondary node;

applying the first measurement configuration only when the primary cell of the secondary cell group for the user equipment is being provided by the first cell;

wherein the measurement configuration information further comprises at least one measurement configuration comprising a measurement identifier for evaluating a subsequent conditional primary cell of secondary cell group change (subsequent CPC) execution condition configured to be applied by the user equipment after the user equipment switches the user equipment's primary cell of the secondary cell group from the first cell to a second cell provided by a second secondary node;

switching said primary cell of the secondary cell group from the first cell to the second cell; and after switching said primary cell, performing measurements in the second cell in accordance with the received at least one measurement configuration for evaluating the subsequent CPC execution condition.

2. A method as claimed in claim 1, comprising:

receiving, from the second secondary node, at least one secondary cell measurement configuration to be applied when the primary cell of the secondary cell group is the second cell;

stopping said performing measurements in accordance with the received at least one measurement configuration; and initiating performing measurements in the second cell in accordance with the received at least one secondary cell measurement configuration.

3. A method as claimed in claim 1, wherein the at least one measurement configuration is independent of a second measurement configuration association with the second secondary node.

4. A method as claimed in claim 1, comprising using the at least one measurement configuration when the primary cell of the secondary cell group for the user equipment is being provided by the first cell.

5. A method as claimed in claim 1, comprising:

generating a measurement configuration variable and storing the measurement configuration variable for use while the primary cell of the secondary cell group is being provided by the second cell.

6. A method as claimed in claim 1, comprising receiving an indication to release the stored measurement configuration variable from the secondary cell currently providing a cell acting as a primary cell of a secondary cell group for the user equipment.

7. A method as claimed in claim 1, comprising:

receiving, from the second secondary node, at least one secondary cell measurement configuration to be applied by the user equipment when the second cell is acting as the primary cell of the secondary cell group for the user equipment; and applying the received at least one measurement configuration in addition to a measurement configuration provided by the second secondary node.

8. A method as claimed in claim 1, comprising indicating measurement objects and measurement identifiers applied in the measurement configurations as part of a persistent measurement configuration configured by the master node.

9. A user equipment configured to operate with dual connectivity to a master node and a first secondary node, the user equipment comprising: at least one processor; and at least one memory comprising code that, when executed by the at least one processor, causes the user equipment to:

maintain data connectivity with a first cell provided by the first secondary node by using the first cell as a primary cell of a secondary cell group;

receive, from the master node, a measurement configuration information comprising:

a first measurement configuration associated with the first secondary node;

apply the first measurement configuration only when the primary cell of the secondary cell group for the user equipment is being provided by the first cell;

wherein the measurement configuration information further comprises at least one measurement configuration comprising a measurement identifier for evaluating a subsequent conditional primary cell of secondary cell group change (subsequent CPC) execution condition configured to be applied by the user equipment after the user equipment switches the user equipment's primary cell of the secondary cell group from the first cell to a second cell provided by a second secondary node;

switch said primary cell of the secondary cell group from the first cell to the second cell; and after switching said primary cell, perform measurements in the second cell in accordance with the received at least one measurement configuration for evaluating the subsequent CPC execution condition.

* * * * *